United States Patent [19]
Ueyama

[11] Patent Number: 5,881,035
[45] Date of Patent: *Mar. 9, 1999

[54] OPTICAL PICKUP DEVICE, OPTICAL DISK RECORDING/REPRODUCING APPARATUS, AND METHOD OF GENERATING FOCUS ERROR SIGNAL

[75] Inventor: Tetsuo Ueyama, Yamatokoriyama, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 760,439

[22] Filed: Dec. 4, 1996

[30] Foreign Application Priority Data

Dec. 4, 1995 [JP] Japan .................. 7-315642

[51] Int. Cl.$^6$ ........................................ G11B 7/00
[52] U.S. Cl. ............................ 369/44.23; 369/44.41
[58] Field of Search .................. 369/44.37, 44.38, 369/44.41, 44.42, 44.12, 44.23, 94, 112, 44.27, 44.26

[56] References Cited

U.S. PATENT DOCUMENTS

| | | | |
|---|---|---|---|
| 4,366,377 | 12/1982 | Notthoff | 369/44.42 |
| 4,998,235 | 3/1991 | Ishibashi et al. | 369/44.41 |
| 5,113,386 | 5/1992 | Whitehead et al. | 369/44.42 |
| 5,128,914 | 7/1992 | Kurata et al. | 369/44.37 |
| 5,253,237 | 10/1993 | Miyake et al. | 369/44.37 |
| 5,283,772 | 2/1994 | Miyake et al. | |
| 5,293,367 | 3/1994 | Kadowaki et al. | 369/44.37 |
| 5,347,504 | 9/1994 | Ito et al. | 369/44.41 |
| 5,487,060 | 1/1996 | Rosen et al. | 369/94 |

OTHER PUBLICATIONS

M. Takahiro, et al., "Optical Pickup Device", Japanese Unexamined Patent Application No. (Tokukaihei) 4–21928, Published Jan. 24, 1992.

Japanese Unexamined Patent Patent Application No. (Tokukaihei) 5–151609, Published Jun. 18, 1993.

*Primary Examiner*—Thang V. Tran
*Attorney, Agent, or Firm*—David G. Conlin; William J. Daley, Jr.

[57] ABSTRACT

Light from a semiconductor laser is converged by an objective lens onto an optical disk, and return light thereof is directed to a light receiving element by a three-division hologram element. The light receiving element includes a two-division main light receiving region for detecting a focus error signal and sub light receiving regions respectively provided on both sides of the main light receiving region for compensating the focus error signal. Based on output signals of the above main and sub light receiving regions, a focus error signal is detected. Note that it is arranged that the sub light receiving regions receive the return light from the optical disk and hence output signals only when the objective lens defocuses being positioned outside a dynamic range. Therefore, with the use of outputs of the sub light receiving regions, the focus error signal is quickly converged to 0, when the objective lens is positioned outside the dynamic range. As a result, even during a focus servo with respect to a multilayer optical disk wherein recording layers are provided at small intervals, it is possible to obtain an accurate focalizing position of the objective lens since respective focus error signals, obtained with respect to each recording layer, do not interfere each other.

26 Claims, 15 Drawing Sheets

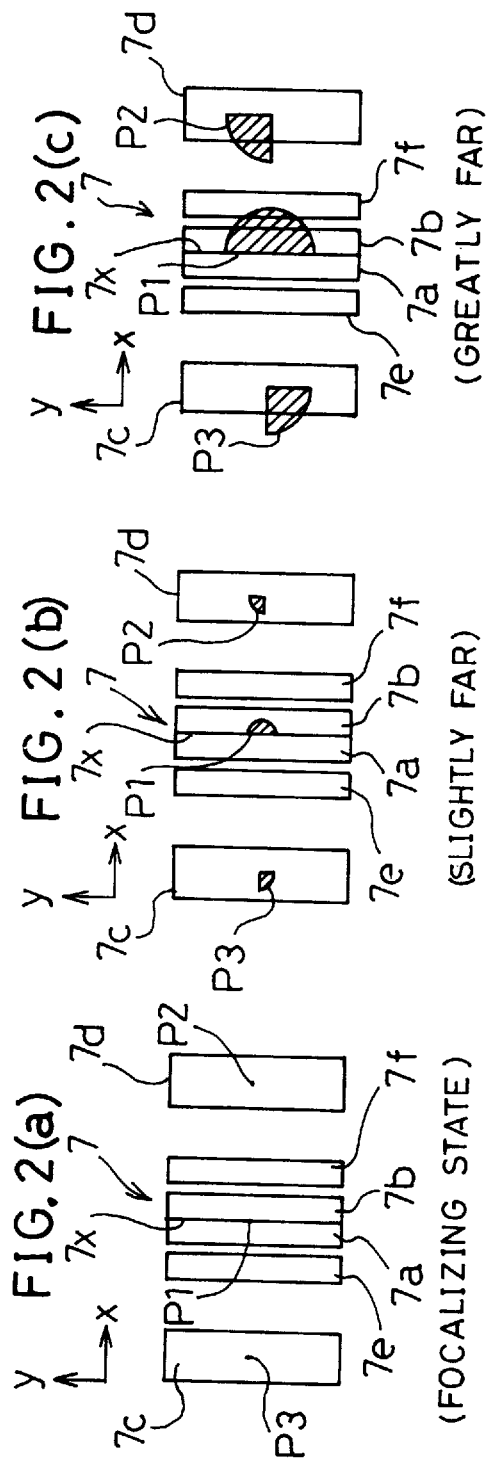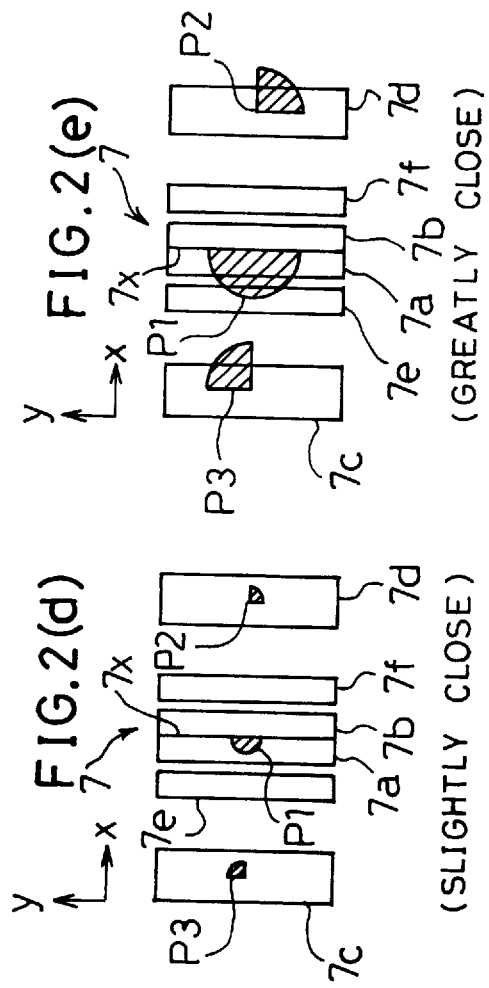

(FOCALIZING STATE) (SLIGTLY FAR) (GREATLY FAR) (SLIGHTLY CLOSE) (GREATLY CLOSE)

(FOCALIZING STATE)

(TOO FAR)

(TOO CLOSE)

OPTICAL PICKUP DEVICE, OPTICAL DISK RECORDING/REPRODUCING APPARATUS, AND METHOD OF GENERATING FOCUS ERROR SIGNAL

FIELD OF THE INVENTION

The present invention relates to an optical pickup device and an optical disk recording/reproducing apparatus for optically recording and reproducing information with respect to an information recording medium such as an optical disk, and a method of generating a focus error signal whereby the optical pickup device and the optical disk recording/reproducing apparatus generate a focus error signal. More particularly, the present invention relates to an optical pickup device and an optical disk recording/reproducing apparatus which are capable of accurate recording/reproducing operations with respect to an optical disk having a plurality of recording/reproducing layers, and a method of generating a focus error signal which enables it.

BACKGROUND OF THE INVENTION

Recently, since an optical disk is capable of recording a large quantity of information at a high density, the utilization of the optical disks has been promoted in various fields such as audiovisual apparatuses, videos, and computers. In this trend, an increase in the recording capacity has been further demanded, on which various attempts have been made, including a method of providing an optical disk having a multilayer configuration.

For example, the Japanese Publication of Laid-Open Patent Application No. 5-151609/1993 (Tokukaihei 5-151609) discloses an optical disk apparatus for individually reproduce recording data from each data layer of an optical disk which has a multiple data layer configuration. Operational principles of this optical disk is described below, with reference to FIG. 18.

Recording/reproducing layers 31 through 38 of a multi-layer disk 30 are formed between transparent substrates 21 and air layers 22 which are alternately provided. During an information recording and reproducing operation, a laser beam is focused on each of the recording/reproducing layers 31 through 38, by moving an objective lens 4 in an optical axis direction with the use of an actuator 23. In the case where, during the focusing, a focal point of the laser beam is being moved in the vicinity of one recording/reproducing layer in the optical axis direction with the move of the objective lens 4, a focus error signal (hereinafter referred to as FES) has a sigmoid waveform (hereinafter referred to as FES curve), becoming 0 when the laser beam is rightly focused.

FIG. 19 illustrates an FES curve in this case. Since the recording/reproducing layers in this case have intervals therebetween of around 400 $\mu$m each which is sufficient, no reverse affection is caused by return lights from adjacent recording/reproducing layers. Therefore, when the objective lens 4 is moved, substantially independent FES curves are obtained with respect to each of the recording/reproducing layers 31 through 38. Specifically, since the layers are provided sufficiently apart from each other, an FES curve of an n'th layer becomes 0 when an n+1'th layer or an n−1'th layer is focused, thereby causing no affection such as offsets to FES curves of the other layers.

Note that in this case, since each interval between the layers is not small, a thickness of the disk substrate to be focused changes to a great extent, when a focus servo is carried out with respect to each layer. Therefore, as illustrated in FIG. 18, it is necessary to individually correct spherical aberrations caused in each plane with the use of an aberration compensator 26.

On the other hand, a disk of a two-layer structure, wherein data layers are provided at a sufficiently small interval compared with a thickness of a substrate, for example, 30 to 40 $\mu$m, has been proposed as a digital video disk (DVD) or the like. In this case, since spherical aberrations due to differences between thicknesses of individual substrates are sufficiently small, the aberration compensator 26 is unnecessary. As an optical system suitable for such a disk of the two-layer structure wherein data layers are provided at a sufficiently small interval, an optical system disclosed in the Japanese Publication for Laid-Open Patent Application No. 4-21928/1992 (Tokukaihei 4-21928) is given as an example.

FIG. 20 illustrates the optical system disclosed in the above publication. A light emitted from a semiconductor laser 1 as a light source is diffracted by a hologram element 2, and a zeroth diffracted light, among all the lights obtained by diffraction, enters a reshaping prism 24 through a collimator lens 3. A light beam, reshaped by the reshaping prism 24, is converged on an optical disk 6 through an objective lens 4. A return light of the light beam passes through the reshaping prism 24 and the collimator lens 3 and is directed to the hologram element 2, thereby being caused to form a beam R whose cross section is oval as illustrated in FIG. 21. The beam R is projected on a light receiving element 25 (see FIG. 22), and the light receiving element 25 converts optical signals obtained from the beam R into electric signals, and outputs the electric signals.

When being viewed from the side of the optical disk 6, the hologram element 2 is, as illustrated in FIG. 21, divided into three division regions 2a, 2b, and 2c, by a division line 2g in a y direction which is conformed to a radial direction of the optical disk 6, and a division line 2h which starts at the midpoint of the division line 2g and is directed in an x direction which is orthogonal to the radial direction of the optical disk 6, that is, directed in a track direction of the optical disk 6. So as to correspond to each of the division regions 2a through 2c, respective gratings are prepared.

As shown in FIGS. 22(a) through 22(c), the light receiving element 25 has four rectangular light receiving regions 25a through 25d which are lined in the x direction which conforms to the track direction of the optical disk 6. The light receiving regions 25a and 25b (focusing-use light receiving regions) are provided adjacent in the center with a division line 25x therebetween, which is directed in the y direction which conforms to the radial direction of the optical disk 6. On the other hand, the light receiving regions 25c and 25d (tracking-use light receiving regions) are respectively provided beside the light receiving regions 25a and 25b with a predetermined interval each therebetween, so that the light receiving regions 25a through 25d are lined in the x direction. Each of the light receiving regions 25a through 25d has a long rectangular shape with its longitudinal direction conformed to the y direction which corresponds to the radial direction.

When the light from the semiconductor laser 1 is focused with respect to the optical disk 6, a focusing-use return light, which has been diffracted at the division region 2a of the hologram element 2, forms a dot-like beam spot P1 on the division line 25x, as illustrated in FIG. 22(a). A tracking-use return light which has been diffracted at the division region 2b forms a beam spot P2 on the light receiving region 25d, while a tracking-use return light which has been diffracted at the division region 2c forms a beam spot P3 on the light receiving region 25c. The beam spots P1 through P3 may in some cases be formed at positions somewhat displaced in the y direction from the respective centers of the light receiving regions 25a through 25d, so that position tolerance of the light receiving element 25, drift of a wave length of the light, or the like, are absorbed by adjusting the position of the hologram element 2.

The beam spot P1 expands either in the light receiving region 25b or in the light receiving region 25a, as shown in FIG. 22(b) in the case a distance between the optical disk 6 and the objective lens is too great, and in FIG. 22(c) in the case the distance is too small. Here, when output signals from the light receiving regions 25a, 25b, 25c, and 25d are given as Sa, Sb, Sc, and Sd, respectively, the focusing error signal FES can be obtained by calculation of (Sa–Sb) by the single knife edge method.

A tracking error signal (hereinafter referred to as RES) can be obtained by calculation of (Sc–Sd) by the push-pull method, namely, by comparing diffracted lights respectively from the division regions 2b and 2c which are thus divided by the division line 2h directed in the track direction of the optical disk 6.

The following description will discuss in detail the correlation between the FES curve and the beam spot formed on the light receiving element 25. The hologram element 2 and the light receiving element 25 are adjusted so that in a focalizing state the beam spot P1 is formed on the division line 25x as shown in FIG. 22(a), namely, so that the light is evenly projected on the light receiving regions 25a and 25b. When the objective lens 4 is positioned farther from the optical disk 6 than when it is in the focalizing state, the beam spot P1 expands in the light receiving region 25b as shown in FIG. 22(b). Therefore, a light quantity in the light receiving region 25b increases, thereby causing the FES to have a negative value. In contrast, when the objective lens 4 is positioned closer, the beam spot Pi expands in the light receiving region 25a as shown in FIG. 22(c), and a light quantity of the light receiving region 25a increases, thereby causing the FES to have a positive value.

The FES curve obtained in this case is a curve F' shown in FIG. 23, which substantially linearly changes till the beam spot P1 protrudes from the light receiving region 25a or 25b. When the beam spot P1 is protruding from the light receiving region 25a or 25b, the light quantity in the light receiving region 25a or 25b is decreasing, thereby causing the absolute value of the FES to decrease and finally converges to 0.

A range between (1) the position of the objective lens 4 when the beam spot P1 starts protruding from the light receiving region 25a in the case where the objective lens 4 becomes closer to the optical disk 6 than when it is in the focalizing state, and (2) the position of the objective lens 4 when the beam spot P1 starts protruding from the light receiving region 25b in the case where the objective lens 4 becomes farther, is called a dynamic range Dy. In other words, a distance Dy between the positive peak of the FES and the negative peak of the FES is called the dynamic range Dy. Usually a width of about 15 $\mu$m is required for the dynamic range Dy, so that a pull-in range of the focus servo is ensured. The respective widths of the light receiving regions 25a and 25b are determined so that within the dynamic range Dy, the beam spot P1 does not protrude from the light receiving regions 25a and 25b. With greater widths of the light receiving regions 25a and 25b, the dynamic range Dy can be set wider, but on the contrary the light receiving regions have greater areas thereby causing frequency characteristics to deteriorate. Therefore, the dynamic range Dy is set to the narrowest possible.

Note that in the following descriptions, a state wherein the objective lens 4 is displaced from the position in the focalizing state outside the Dynamic range Dy, that is, greatly close to or greatly far from a recording/reproducing layer of the optical disk 6 to be focused, is regarded as a greatly defocusing state. On the other hand, a state wherein the objective lens 4 is displaced within the Dynamic range Dy, that is, slightly close or slightly far from a recording/reproducing layer to be focused, is regarded as a slightly defocusing state.

However, in the case where reproduction is carried out with the use of an optical system shown in FIG. 20 with respect to a multilayer disk wherein the layers are provided at just small intervals (d1 in FIG. 23) of about twice of the width of the dynamic range Dy each, for example, offsets occur to the FES, since one FES curve which has been obtained with respect to a data surface of a layer does not sufficiently converge to 0 when another FES curve is obtained with respect to a data surface of an adjacent layer.

FIGS. 24 and 25 illustrate FES curves obtained from two layers (first and second layers) adjacent to each other in a plurality of layers. The horizontal axis T represents displacement of the objective lens 4, and T1 and T2 represent respective positions of the objective lens 4 when the convergent beam is rightly focused on the first and second layers. An FES curve obtained with respect to the first layer is denoted F1', while an FES curve obtained with respect to the second layer is denoted F2'. But, provided that respective quantities of light reflected from the first and second layers are equal to each other, what is actually obtained is an FES curve indicated by a broken line denoted F3' in FIG. 24, which is a resultant curve of the curves F1' and F2'.

A solid line in FIG. 25 indicates the FES curve F3'. As is clear from FIG. 25, since the FES curves obtained with respect to the data surface of the adjacent layer does not converge to 0, FES offsets $\Delta f1$ and $\Delta f2$ respectively occur at T1 and T2 which are the positions of the objective lens 4 when the convergent beam is rightly focused on the first and second layers, respectively. Therefore, detection sensitivity also changes.

FIGS. 24 and 25 illustrate only FES curves obtained with respect to the two adjacent layers, but in the case with three or more layers, such reverse affect is multiplied, thereby causing such offsets and detection sensitivity to further change, and hence making it more difficult to conduct a normal focus servo.

SUMMARY OF THE INVENTION

The object of the present invention is to provided an optical pickup device, an optical disk recording/reproducing apparatus, and a method of generating a focus error signal, which are capable of detect or generate a focus error signal (FES) in which each FES curve obtained with respect to each layer does not interfere each other (namely, in a focalizing state with respect to one recording/reproducing layer, no offset occurs due to an FES curve from a layer adjacent to the focused layer), when a recording/reproducing operation is carried out with respect to a multilayer disk wherein a plurality of recording/reproducing layers are provided at small intervals therebetween.

The optical pickup device of the present invention comprises:

a light receiving element for detecting a focus error signal;

an optical system for converging a laser beam onto an optical disk through a converging member, while conducting return light of the laser beam projected on the optical disk to said light receiving element; and focus error signal generating unit for generating a focus error signal based on an output of said light receiving element which changes in accordance with a change in a relative distance between said converging member and a recording/reproducing layer of the optical disk, wherein:

said light receiving element includes at least two main light receiving regions and at least two sub light receiving regions, said main light receiving regions outputting a main part of the focus error signal, said sub light receiving regions receiving the return light and outputting a compensation part of the focus error signal only in the case where said converging member is displaced from a focalizing position to outside a dynamic range; and said focus error signal generating unit generates the focus error signal in accordance with the outputs of said main light receiving regions and said sub light receiving regions.

In the above described optical pickup device, the focus error signal is generated based on the outputs of the main light receiving regions and the outputs of the sub light receiving regions, which change in accordance with the change in the relative distance between the converging member and the recording/reproducing layer of the optical disk. The sub light receiving regions receive the return light and output the compensation-use sub part of the focus error signal only when the converging member is positioned outside the dynamic range. Therefore, by generating the focus error signal using a difference between the outputs of the main light receiving regions and the outputs of the sub light receiving regions, the focus error signal is quickly converged to 0, due to the outputs of the sub light receiving regions which increase as the converging member defocuses to a greater extent.

With the described arrangement, since each focus error signal quickly converges to 0 when the converging member is positioned outside the dynamic range, an FES curve from a recording/reproducing layer does not interfere an FES curve from an adjacent recording/reproducing layer. Therefore, even though the layer interval is small, no offset occurs in the focalizing state with respect to any recording/reproducing layer. As a result, it is possible to make the focus error signal accurate, thereby ensuring the focus servo.

The same effect is obtained with the use of the optical disk recording/reproducing apparatus of the present invention having the above-described pickup device, which is used for recording/reproducing various kinds of information with respect to the optical disk.

Furthermore, according to the focus error signal generating method of the present invention, return light of the laser beam projected onto the optical disk is received by the light receiving element which is divided into a plurality of light receiving regions, and the focus error signal is generated based on the respective outputs of the light receiving regions. To achieve the above object, the light receiving element includes a main light receiving region for outputting a main part of the focus error signal and a sub light receiving region for receiving the return light and outputting a compensation part of the focus error signal only when the converging member is positioned outside the dynamic range and defocuses. The focus error signal is generated based on the respective outputs of the main and sub light receiving regions.

In the case where the focus error signal is generated by the above-described method of generating the focus error signal, for example, by using a difference between the output of the main light receiving region and the output of the sub light receiving region when the converging member is positioned outside the dynamic range, the focus error signal is quickly converged to 0 due to the output of the sub light receiving region which increases as the converging member defocuses to a greater extent.

By this method, since the focus error signal quickly converges to 0 when the converging member is positioned outside the dynamic range, an FES curve from a recording/reproducing layer does not interfere an FES curve from an adjacent recording/reproducing layer. Therefore, even though the layer interval is small, no offset occurs in the focalizing state with respect to any recording/reproducing layer. As a result, the focus error signal can be made accurate.

A preferable example of the optical pickup device of the present invention is characterized in that:

said main light receiving regions include a first main light receiving region and a second main light receiving region, while said sub light receiving regions include a first sub light receiving region and a second sub light receiving region, in said first main light receiving region and said first sub light receiving region, an area which receives the return light expanding as the relative distance between said converging member and said recording/reproducing layer becomes smaller than that in a focal distance which is obtained when the laser beam is converged on a data plane of the optical disk, in said second main light receiving region and said second sub light receiving region, an area which receives the return light expanding as the relative distance between said converging member and said recording/reproducing layer becomes greater than the focal distance, an output of said first main light receiving region and an output of said second sub receiving region constituting a first combination output, an output of said second main light receiving region and an output of said first sub receiving region constituting a second combination output, said first main light receiving region outputting a signal $S_m$, said first sub light receiving region outputting a signal $S_s$, said second main light receiving region outputting a signal $S_m{'}$, said first sub light receiving region outputting a signal $S_s{'}$, wherein said focus error signal generating unit generates the focus error signal by calculating $(S_m+S_s{'})-(S_s+S_m{'})$.

With the described optical pickup device, when the relative distance between the converging member and the optical disk is smaller than the focal distance and the converging member is positioned within the dynamic range, the signals $S_s{'}$ and $S_m{'}$ have values of substantially 0 and the value of $S_m$ always exceeds that of $S_s$, thereby causing the focus error signal to be positive. On the other hand, when the converging member is displaced to outside the dynamic range, the signal $S_m$ is gradually converged to 0, but the focus error signal is quickly converged to 0 since the signal $S_s$ is subtracted from the signal $S_m$.

Furthermore, when the relative distance between the converging member and the optical disk is greater than the focal distance and the converging member is positioned within the dynamic range, the signals $S_m$ and $S_s$ have values of substantially 0 and the value of $S_m{'}$ always exceeds that of $S_s{'}$, thereby causing the focus error signal to be negative.

On the other hand, when the converging member is displaced to outside the dynamic range, the signal $S_m'$ is gradually converged to 0, but the focus error signal is quickly converged to 0 since the signal $S_s'$ is subtracted from the signal $S_m'$.

With the above arrangement, since each focus error signal quickly converges to 0 when the converging member is positioned outside the dynamic range, an FES curve from a recording/reproducing layer does not interfere an FES curve from an adjacent recording/reproducing layer. Therefore, even though the layer interval is small, no offset occurs in the focalizing state with respect to any recording/reproducing layer. As a result, the focus error signal can be made accurate, thereby ensuring the focus servo.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) is a view illustrating a light receiving state of a light receiving element of the optical pickup device in a focalizing state.

FIG. 2(b) is a view illustrating a light receiving state of the light receiving element of the optical pickup device in a slightly defocusing state, wherein an objective lens is positioned farther from the optical disk than in the focalizing state, within a dynamic range.

FIG. 2(c) is a view illustrating a light receiving state of the light receiving element of the optical pickup device in a greatly defocusing state, wherein the objective lens is positioned much farther from the optical disk than in the focalizing state, outside the dynamic range.

FIG. 2(d) is a view illustrating a light receiving state of the light receiving element of the optical pickup device in a slightly defocusing state, wherein the objective lens is positioned closer to the optical disk than in the focalizing state, within the dynamic range.

FIG. 2(e) is a view illustrating a light receiving state of the light receiving element of the optical pickup device in a greatly defocusing state, wherein the objective lens is positioned much closer to the optical disk than in the focalizing state, outside the dynamic range.

DESCRIPTION OF THE PREFERRED EMBODIMENTS

<First Embodiment>

Figure 1:
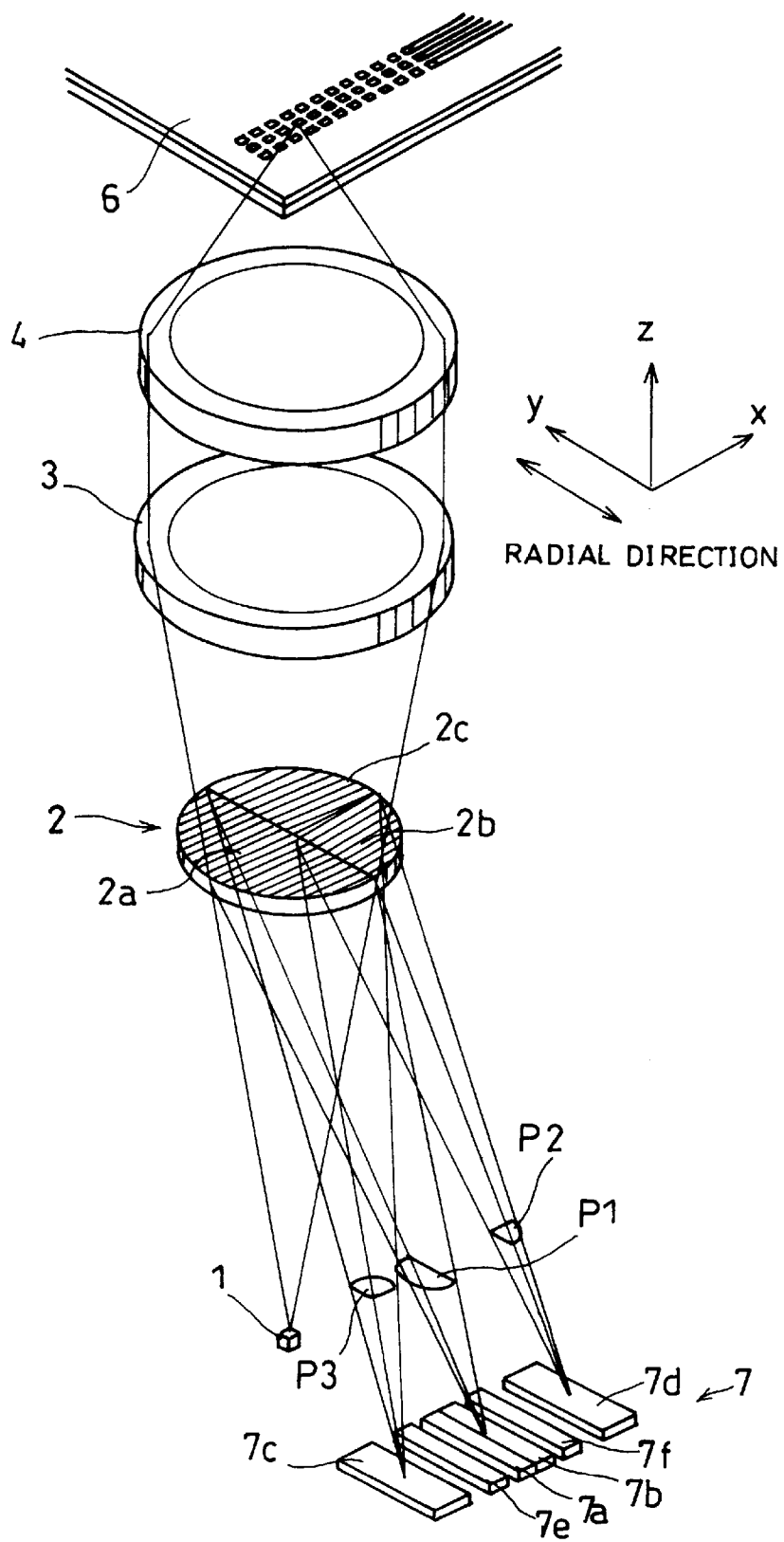
FIG. 1 is a schematic view illustrating an arrangement of an optical system of an optical pickup device in accordance with one embodiment of the present invention.

The following description will discuss an embodiment of the present invention. The members having the same structure (function) as those in the prior arts will be designated by the same reference numerals.

As illustrated in FIG. 1, an optical system for use in an optical pickup device in accordance with the present embodiment includes a semiconductor laser 1 for emitting a laser beam, a hologram element 2 for diffracting the light emitted from the semiconductor laser 1, a collimator lens 3, an objective lens 4 as converging means, and a light receiving element 7 for converting optical signals obtained from the received light into electric signals and outputting the electric signals thus obtained.

An optical disk 6 used for illustrating the present embodiment has a two-layer structure, wherein data layers are provided with an interval therebetween which is sufficiently small in comparison with a thickness of a substrate, for example, around 30 to 40 μm. This type of disk has been proposed as a digital video disk (DVD) or the like.

Figure 21:
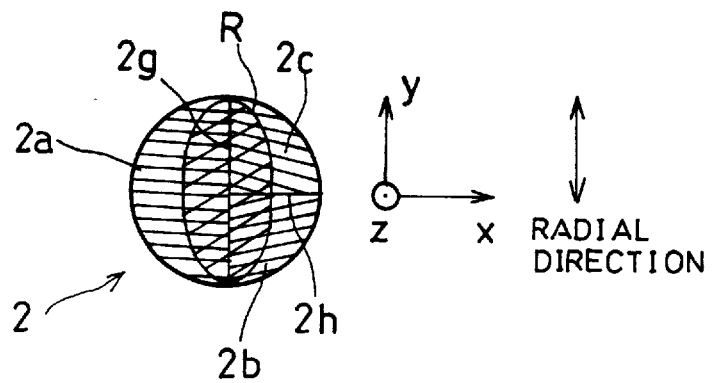
FIG. 21 is a view illustrating a hologram element in the optical pickup device.

Like in the case as shown in FIG. 21, the hologram element 2 is divided into three division regions 2a, 2b, and 2c, by a division line 2g directed in a y direction which is conformed to a radial direction of the optical disk 6, and a division line 2h which starts at the midpoint of the division line 2g and is directed in an x direction which is orthogonal to the radial direction of the optical disk 6, that is, directed in a track direction of the optical disk 6. So as to correspond to each of the division regions 2a through 2c, respective gratings are formed.

As illustrated in FIGS. 2(a) through 2(e), the light receiving element 7 has four rectangular light receiving regions 7a through 7d lined in the x direction which is conformed to the track direction of the optical disk 6. The light receiving regions 7a and 7b (focusing-use light receiving regions) provided in the center are formed by dividing a single light receiving region by a division line 7x, which is directed in the y direction which is conformed to the radial direction of the optical disk 6. On the other hand, the light receiving region 7c (tracking-use light receiving region) is provided on a side of the light receiving region 7a opposite to the division line 7x with a predetermined interval, while the light receiving region 7d (tracking-use light receiving region) is provided on a side of the light receiving region 7b opposite to the division line 7x with a predetermined interval. Each of the light receiving regions 7a through 7d is provided with its longitudinal direction conformed to the y direction which is conformed to the radial direction.

Here, in addition to the four rectangular light receiving regions 7a through 7d which are lined in the x direction conforming to the track direction of the optical disk 6, light receiving regions 7e and 7f are provided between the light receiving regions 7a and 7c and between the light receiving regions 7b and 7d, respectively. The light receiving regions 7e and 7f are provided symmetrically with respect to the division line 7x. The direction of the division line 7x and the respective longitudinal directions of the light receiving regions 7a, 7b, 7c, and 7d are the same as those of the light receiving element 25 shown in FIGS. 22(a) through 22(c).

Figure 20:
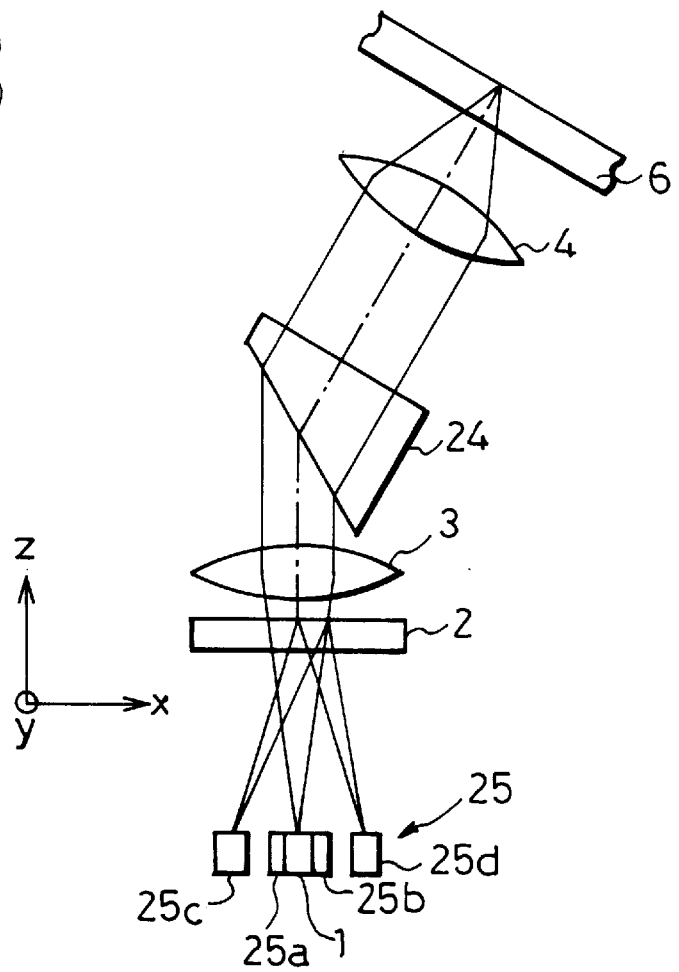
FIG. 20 is a schematic view illustrating an arrangement of another optical system of the optical pickup device.

In the optical pickup device of the present embodiment, like in the case illustrated in FIG. 20, a light emitted from the semiconductor laser 1 as a light source is diffracted by the hologram element 2, a zeroth diffracted light, among diffracted lights obtained by the diffraction by the hologram element 2, is converged on the optical disk 6 through the collimator lens 3 and the objective lens 4. A reflected light from the optical disk 6 is directed to the hologram element 2 through the objective lens 4 and the collimator lens 3.

As a result, a beam R (see FIG. 21) is formed by the hologram element 2. The beam R is projected on some of the light receiving regions 7a through 7f of the light receiving element 7, so that rays from division regions 2a through 2c of the hologram element 2 are respectively projected on corresponding light receiving regions of the light receiving element 7. The light receiving element 7 converts optical signals of the beam R into electric signals and output the electric signals.

In the present embodiment, the optical pickup device also has an arrangement wherein, in a focalizing state, a return light which has been diffracted at the division region 2a of the hologram element 2 forms a beam spot P1 on the division line 7x, while return lights which have respectively been diffracted at the division regions 2b and 2c form beam spots P2 and P3 on the light receiving regions 7d and 7c, respectively. This arrangement is the same as that described with reference to FIGS. 22(a) through 22(c).

Figure 22A:
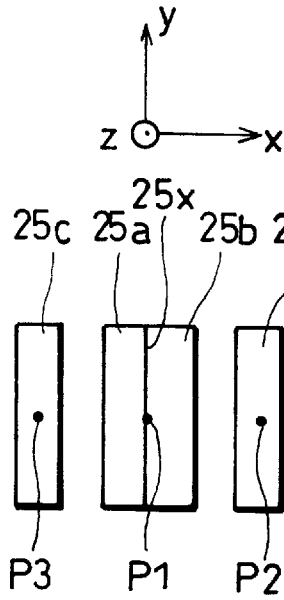
FIG. 22(a) is a view illustrating a light receiving state of a light receiving element of the above optical pickup device in a focalizing state.
Figure 22B:
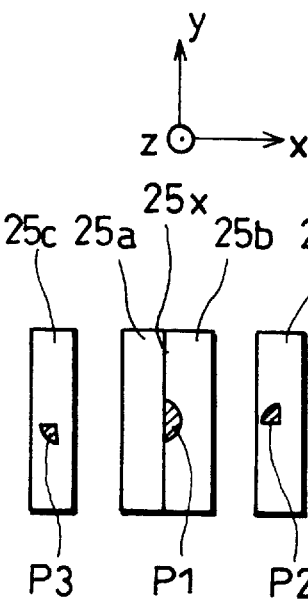
FIG. 22(b) is a view illustrating a light receiving state of the light receiving element of the above optical pickup device when an objective lens is positioned farther from an optical disk than in the focalizing state.
Figure 22C:
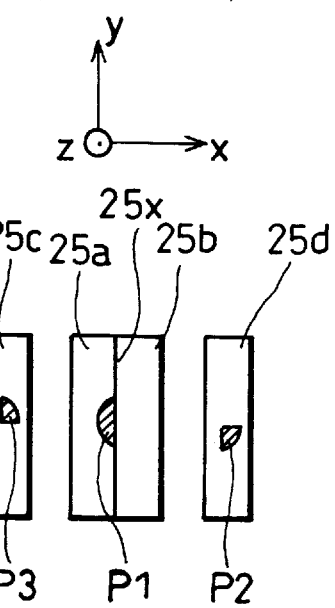
FIG. 22(c) is a view illustrating a light receiving state of the light receiving element of the above optical pickup device when the objective lens is positioned closer to the optical disk than in the focalizing state.

The arrangement in accordance with the present embodiment is different from the arrangement shown in FIGS. 22(a) through 22(c) in that: the light receiving regions 7e and 7f are added to the light receiving regions 7a through 7d, as has been described, and when output signals from the light receiving regions 7a, 7b, 7c, 7d, 7e, and 7f are given as Sa, Sb, Sc, Sd, Se, and Sf respectively, the focusing error signal FES can be obtained by calculation of (Sa+Sf)−(Sb+Se).

When the light from the semiconductor laser 1 is focused with respect to the optical disk 6, a focusing-use return light, which has been diffracted at the division region 2a of the hologram element 2, forms a dot-like beam spot P1 on the division line 7x. A tracking-use return light which has been diffracted at the division region 2b forms a beam spot P2 on the light receiving region 7d, while a tracking-use return light which has been diffracted at the division region 2c forms a beam spot P3 on the light receiving region 7c. The beam spots P1, P2, and P3 may in some cases be formed at positions somewhat displaced in the y direction from the respective centers of the light receiving regions, so that position tolerance of the light receiving element, drift of a wave length of light, or the like, are absorbed by adjusting the position of the hologram element 2.

The beam spot P1 expands either in the light receiving region 7b or in the light receiving region 7a, as shown in FIG. 2(b) in the case where the objective lens 4 is positioned farther (the objective lens 4 is further displaced) from the optical disk 6 than when the objective lens 4 focalizes, and as shown in FIG. 2(d) in the case the objective lens 4 is closer. As described later, in the case where the objective lens 4 is displaced within the dynamic range Dy, the focus error signal FES is virtually obtained as (Sa−Sb) using the output signals Sa and Sb respectively from the light receiving regions 7a and 7b, like in the case illustrated in FIG. 23. Therefore, the light receiving regions 7a and 7b which generate main components of the focus error signal FES are hereinafter referred to as main light receiving regions, while the light receiving regions 7e and 7f thus added are hereinafter referred to as sub light receiving regions.

When the objective lens 4 is displaced to outside the dynamic range Dy thereby greatly defocusing, the beam spot P1 protrudes from the main light receiving region 7b (second main light receiving region) or the main light receiving region 7a (first main light receiving region), as illustrated in FIGS. 2(c) and 2(e), respectively, and spreads to the sub light receiving region 7f (second sub light receiving region) or the sub light receiving region 7e (first sub light receiving region) which are provided beside the light receiving regions 7a and 7b. The following description will discuss in detail the focus error signal FES in this case, referring to FIG. 3.

Figure 3:
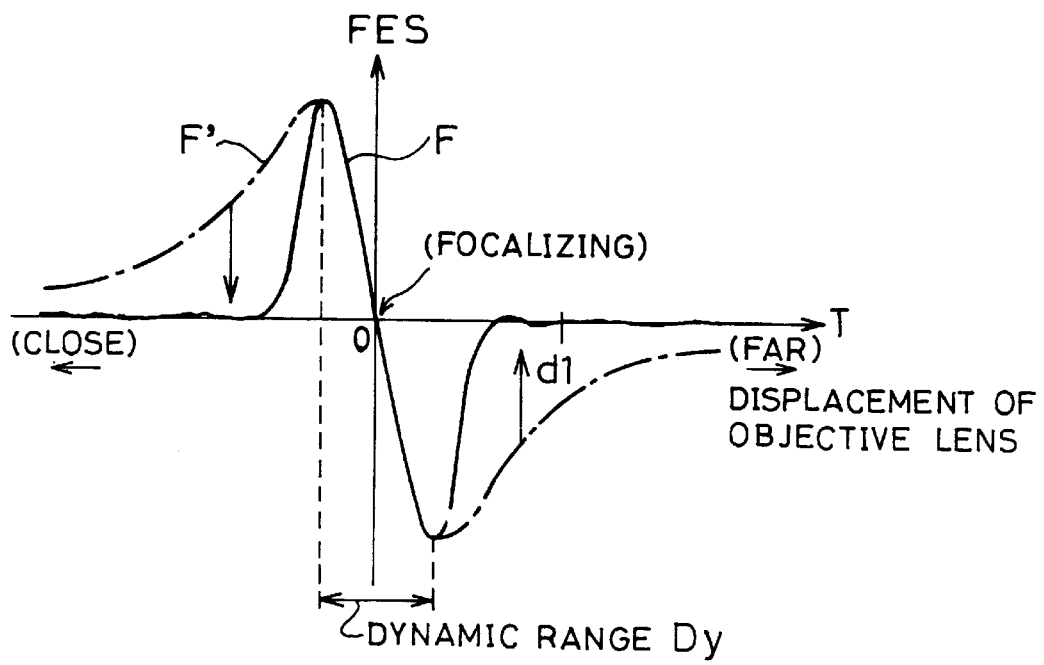
FIG. 3 is a view illustrating an FES curve obtained when the objective lens is positioned in the vicinity of its focalizing position with respect to a recording/reproducing layer.
Figure 23:
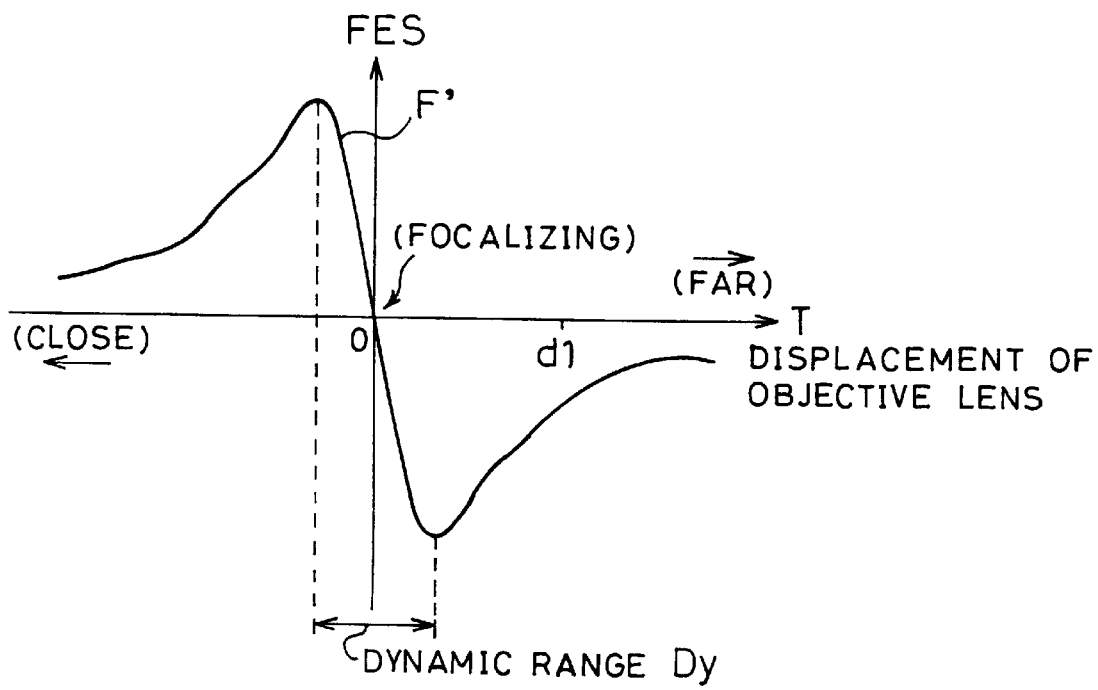
FIG. 23 is a view illustrating an FES curve obtained with respect to a recording/reproducing layer of the above optical disk.
Figure 24:
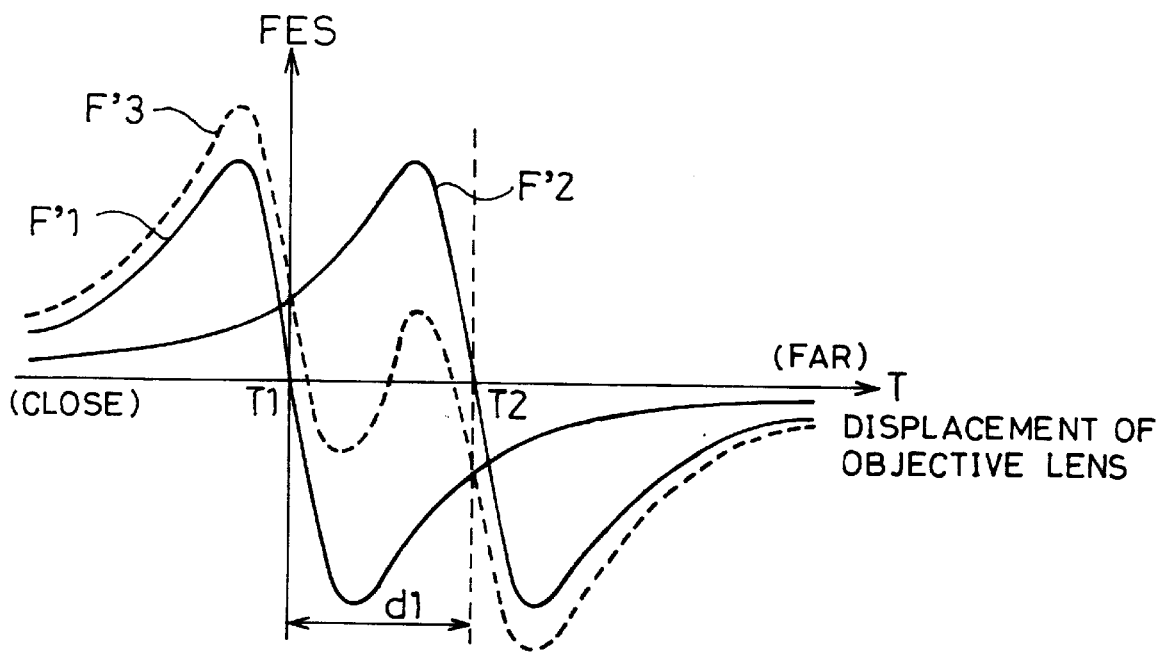
FIG. 24 is a view illustrating a process of synthesizing FES curves respectively obtained from two recording/reproducing layers adjacent to each other with the use of the conventional optical pickup device.
Figure 25:
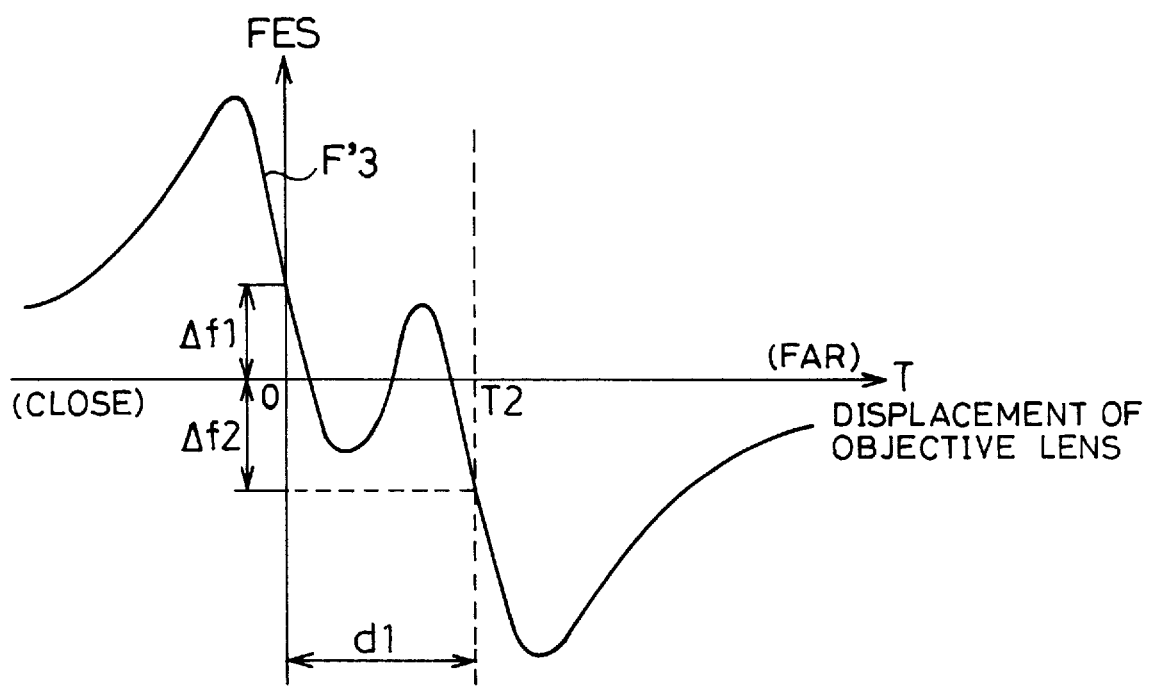
FIG. 25 is a view illustrating an FES curve obtained from two recording/reproducing layers adjacent to each other with the use of the conventional optical pickup device.

In FIG. 3, before the beam spot P1 protrudes out of the main light receiving region 7a or 7b, namely, within the dynamic range Dy, the FES curve is the same as the curve F' shown in FIG. 23. But, when the beam spot P1 protrudes out of the main light receiving region 7a or 7b and enters the sub light receiving region 7e or 7f, a difference between (Sa+Sf) and (Sb+Se) has a drastic change. More specifically, in the case where the objective lens 4 comes off from the focalizing position and goes farther from the optical disk 6 outside the dynamic range Dy, not only the main light receiving region 7b (output: Sb) but also the sub light receiving region 7f (output: Sf) receive light. In contrast, in the case where the objective lens 5 goes closer outside the dynamic range Dy, not only the main light receiving region 7a (output: Sa) but also the sub light receiving region 7e (output: Se) receive light. In either of the described cases where the objective lens 4 is positioned outside the dynamic range Dy and are in the defocusing state, the difference between (Sa+Sf) and (Sb+Se) is caused to have a drastic change since the sub light receiving region 7f or 7e receives light.

As described, in the present embodiment, the focus error signal FES is detected by summing an output of one of the main light receiving regions and an output of one sub light receiving region provided on the side opposite to the direction in which the spot of the return light expands, while summing an output of the other main light receiving region and an output of the other sub light receiving region. Therefore, the focus error signal FES obtained by the calculation of (Sa+Sf)−(Sb+Se) drastically becomes near 0 immediately outside the dynamic range Dy, and converges to substantially 0 when the objective lens 4 is positioned at a distance of the layer interval d1 from the focalizing position, as shown by the solid line F in FIG. 3.

The manner of FES's converging to 0 when the objective lens 4 is positioned outside the dynamic range Dy is changed by changing the shape of the light receiving regions 7e and 7f or by changing distances between the light receiving regions 7a and 7e and between the light receiving regions 7b and 7f. Therefore, by optimizing such conditions, the FES curve, which in the prior arts gradually converges to 0, can be quickly converged to 0.

Figure 4:
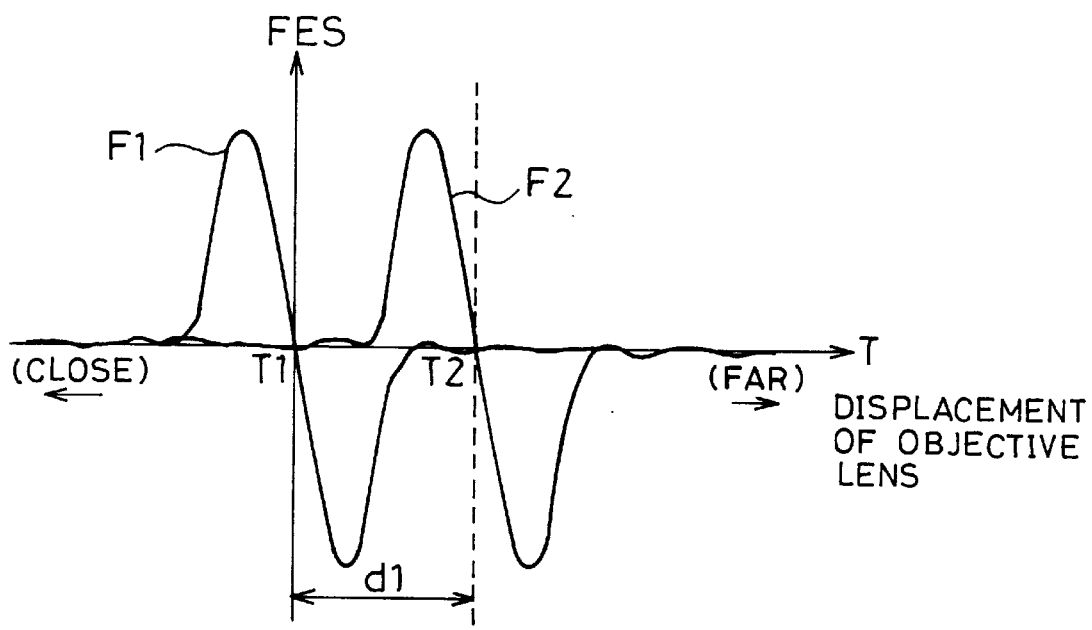
FIG. 4 is an explanatory view illustrating a process of synthesizing FES curves respectively obtained from two recording/reproducing layers adjacent to each other.
Figure 5:
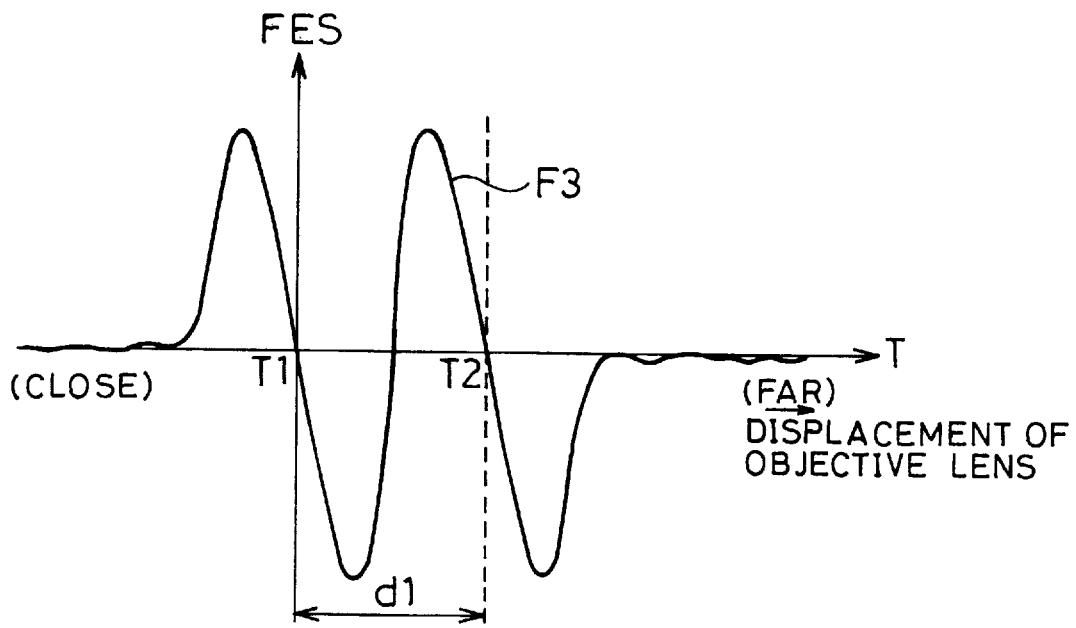
FIG. 5 is a view illustrating an FES curve obtained from the two recording/reproducing layers adjacent to each other.
Figure 6:
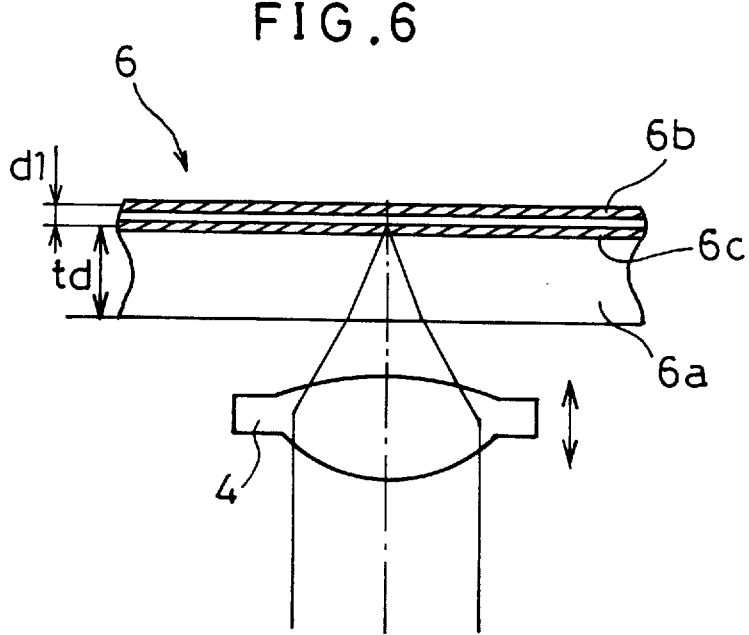
FIG. 6 is a schematic view illustrating a configuration of the optical disk including the two recording/reproducing layers.

The following description will discuss an FES curve obtained in the case where a reproduction operation is carried out with respect to a two-layer disk 6 shown in FIG. 6 with the use of this optical system, while referring to FIGS. 4 and 5. The optical disk 6 in FIG. 6 includes a first recording layer 6b and a second recording layer 6c which are provided with the interval d1 therebetween, on a transparent substrate 6a having a thickness td.

FIGS. 4 and 5 are graphs of FES curves obtained from the two-layer disk 6. A curve F1 in FIG. 4 is an FES curve obtained from the first recording layer 6b of the two-layer disk in the case where the objective lens 4 is moved. A curve F2 is an FES curve obtained from the second recording layer 6c in the case where the objective lens 4 is further moved. Note that T1 and T2 indicate positions of the objective lens 4 in a focalizing state with respect to the first recording layer Gb and with respect to the second recording layer 6c, respectively.

Provided that light quantities from the respective layers are equal, an FES curve actually obtained is a curve F3 in FIG. 5 which is a resultant curve of the curves F1 and F2. Therefore, at respective focalizing positions T1 and T2 with respect to the first and second layers, FES offsets are sufficiently small, thereby causing substantially no change in the detection sensitivity, and hence ensuring the normal focus servo.

Incidentally, the beam spot P1 expands as the distance between the objective lens 4 and the optical disk 6 changes, and the expansion ratio depends on a magnifying power of a lens system. Therefore, a tilt of the FES (FES sensitivity) within the dynamic range Dy is also determined by the magnifying power of the lens system. In the case where the distance between the objective lens 4 and the optical disk 6 further changes after the objective lens 4 goes outside the dynamic range, the beam spot P1 is also expanded at the same ratio, thereby causing a quantity of the light projected outside the main light receiving region 7a or 7b to increases at the same ratio. In the present embodiment, since the quantity of the light protruding from the main light receiving region 7a or 7b is detected with the use of the sub light receiving regions 7e or 7f and the light quantity thus detected is added to the output of the main light receiving region oppositely provided (7f to 7a, while 7e to 7b), the FES can be converged at substantially the same tilt as the FES sensitivity, after the objective lens 4 goes outside the dynamic range Dy. Therefore, it is possible to converge the FES to 0 at a distance of the dynamic range Dy from the focalizing position.

Therefore, the layer interval d1 between the adjacent layers, which is required so that no offset is caused to any FES curve obtained from each layer and the dynamic range Dy can be ensured, can be set as small as possible, as long as it satisfies:

$$d1 > Dy$$

Furthermore, without compensation as carried out in the present embodiment, an FES offset having a magnitude beyond an acceptable range is caused when the objective lens 4 is positioned within a range ten and several times wider than the dynamic range Dy. Therefore, the present invention is effectual when the layer interval d1 is in a range from one-fold to ten-and-several-fold of the dynamic range Dy.

In other words, a distance ten and several times greater than the dynamic range Dy is necessary as the layer interval so that the FES converges to 0 with the use of the conventional optical pickup device, but the optical pickup device of the present invention can be effectually applied to an optical disk which has a layer interval of not greater than ten and several times of the dynamic range Dy.

Note that the tracking error signal RES can be obtained by calculation of (Sc–Sd) by the push-pull method, as in the prior arts. Besides, sufficient distances should be provided between the light receiving regions 7e and 7c and between the light receiving regions 7f and 7d, so that the beam spots P2 and P3 expanded may not enter the FES detecting-use sub light receiving regions 7e and 7f even though the objective lens 4 badly defocuses.

In addition, in the case where the RES is recorded with concave-convex pits, as in reproduction-only optical disks and add-type optical disks, it is possible to use a differential phase detection method utilizing a phase difference between the signals Sc and Se so as to obtain the RES, instead of the push-pull method.

Figure 7:
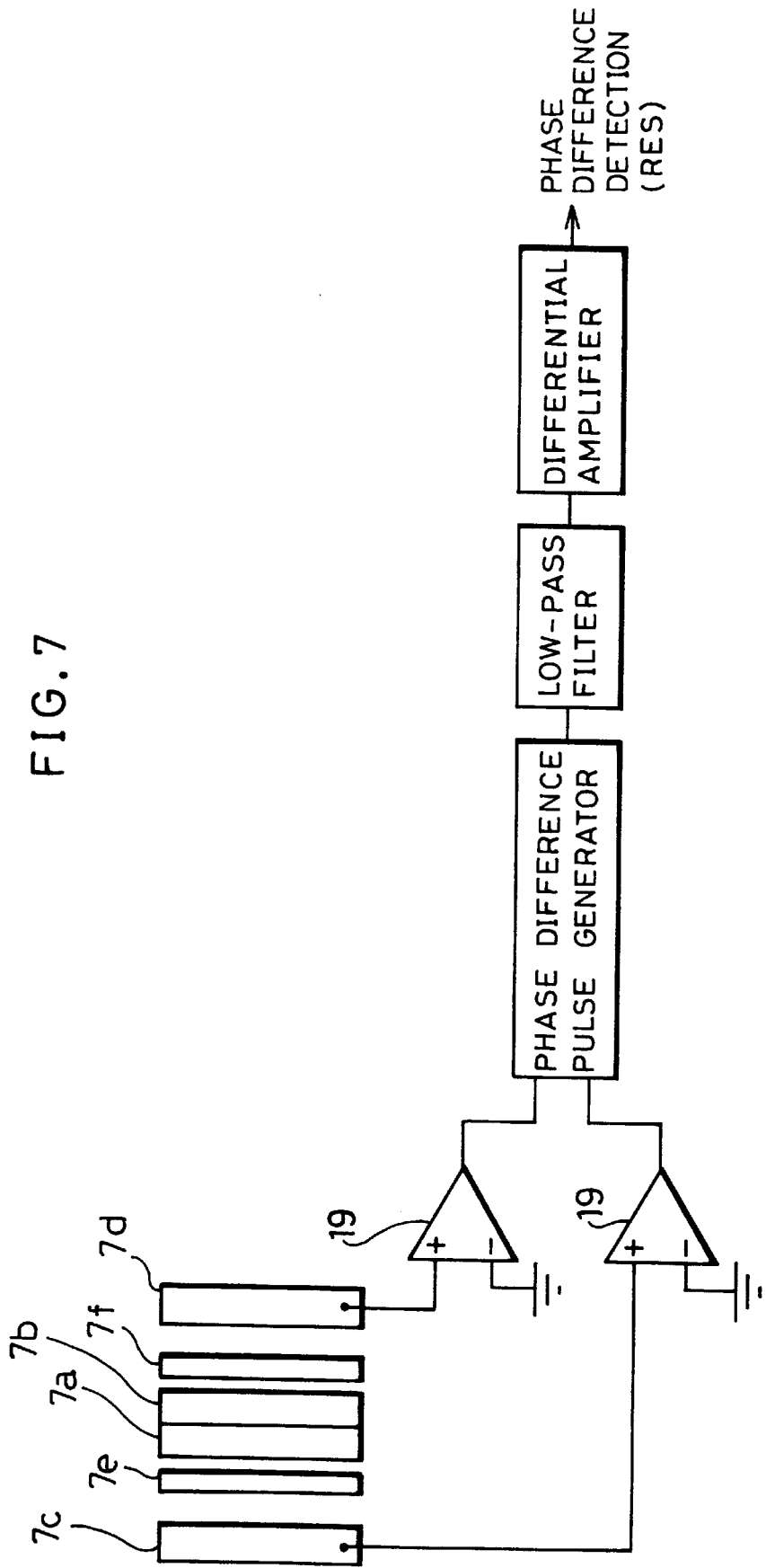
FIG. 7 is an explanatory view illustrating an arrangement for generating RES in the case where the tracking servo is carried out by the phase difference detection method.

In this case, as illustrated in FIG. 7, the respective signals Sc and Sd from the light receiving regions 7c and 7d are converted into binary signals by comparators 19, and a phase difference pulse is generated based on timings of rises and falls of the binary signals. The detection of the RES is carried out based on the phase difference pulse.

Figure 8:
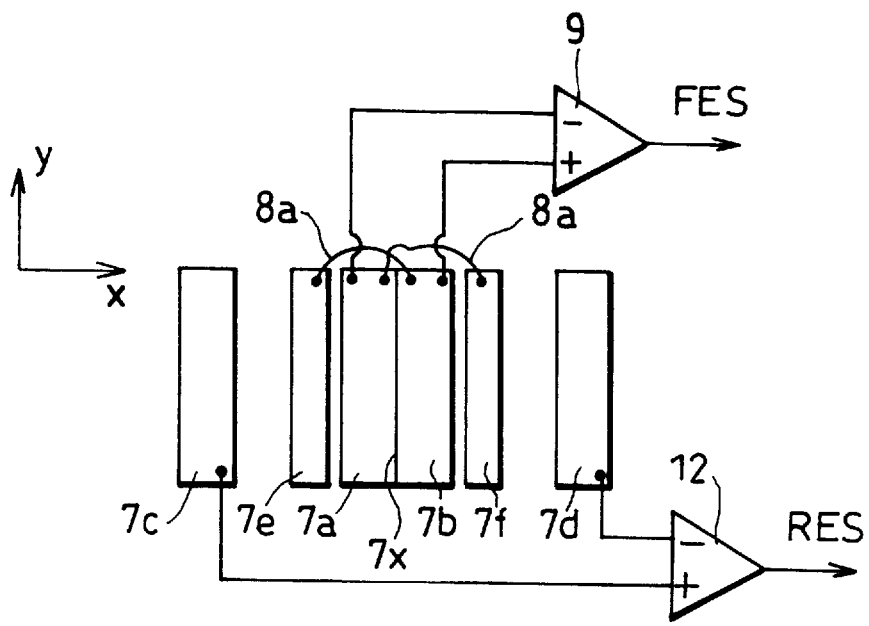
FIG. 8 is a view illustrating an example arrangement of the light receiving element of the optical pickup device illustrated in FIG. 1.
Figure 9:
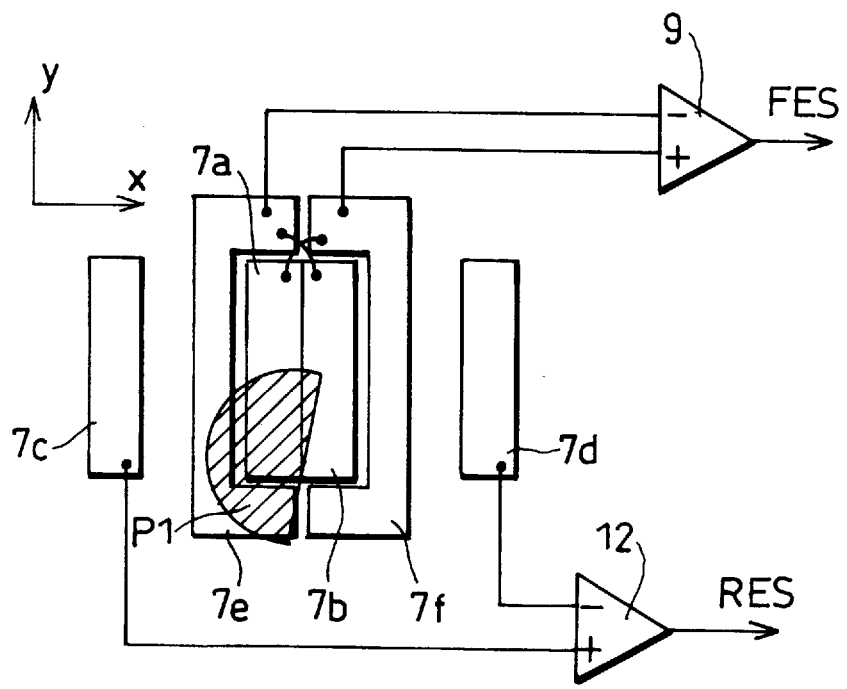
FIG. 9 is a view illustrating another example arrangement of the light receiving element of the optical pickup device.
Figure 10:
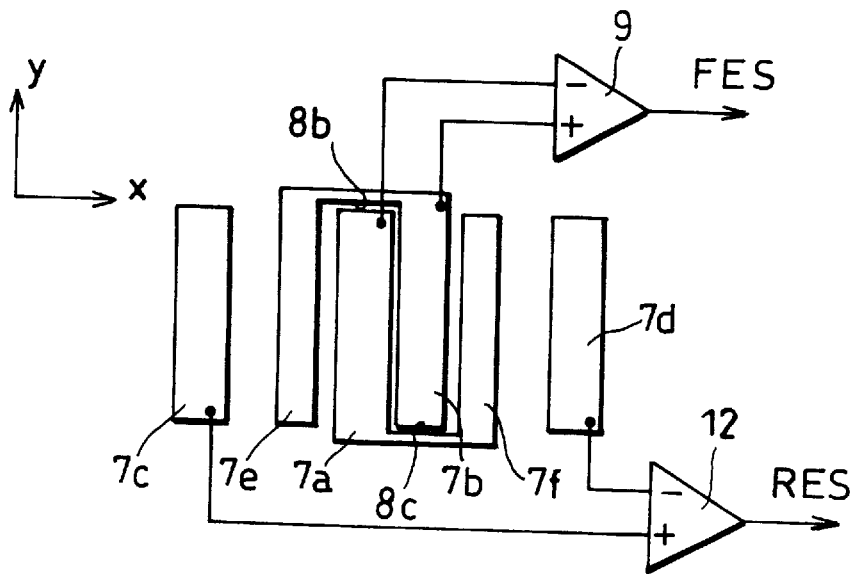
FIG. 10 is a view illustrating still another example of the light receiving element of the optical pickup device.

FIGS. 8 through 10 illustrate example formations of the light receiving regions of the light receiving element 7.

As illustrated in FIG. 8, the light receiving regions 7a, 7b, 7e, and 7f are provided so that the main light receiving region 7a and the sub light receiving region 7f are connected, and the main light receiving region 7b and the sub light receiving region 7e are connected, with metal wires 8a. Therefore, outputs are supplied to a differential amplifier 9 only from the main light receiving regions 7a and 7b. A difference signal detected by a differential amplifier 9 as focus error signal generating means from a difference between the outputs from the main light receiving regions 7a and 7b is used as the focus error signal FES. With this arrangement, compared with the formation of the conventional light receiving element 25 illustrated in FIG. 20, the same package can be used without an increase in the number of output terminals. Instead of supplying outputs from the main light receiving regions 7a and 7b, outputs may be supplied to the differential amplifier 9 from the sub light receiving regions 7e and 7f, and a difference signal thus obtained may be used as the FES.

FIG. 9 illustrates another formation of the light receiving element 7. In FIG. 8 the sub light receiving regions 7e and 7f have the same length as that of the main light receiving regions 7a and 7b, but as shown in FIG. 9 the sub light receiving regions 7e and 7f may have a shape such that the regions 7e and 7f surround the main light receiving regions 7a and 7b. As described in conjunction with the prior arts, in some cases the beam spot P1 is positioned on the division line 7x but near an edge of the light receiving regions due to some adjustment. In this case, the beam spot P1 possibly protrudes from an edge of the main light receiving regions 7a and 7b on the side of the y direction. The formation shown in FIG. 9 has an advantage that even in this case the protruding light is effectually detected by the sub light receiving regions 7e and 7f.

According to an arrangement shown in FIG. 10, the light receiving regions of the light receiving element 7 have light receiving portions 8b and 8c which are extensions of parts of the same, which are provided instead of the metal wires 8a in FIG. 7 so as to connect the main and sub light receiving regions. Therefore, the pairs of the main and sub light receiving regions respectively including the light receiving portions 8b and 8c can be manufactured in integrated patterns, thereby allowing bonding operations with metal wires to be omitted, and hence facilitating mass production.

Figure 11:
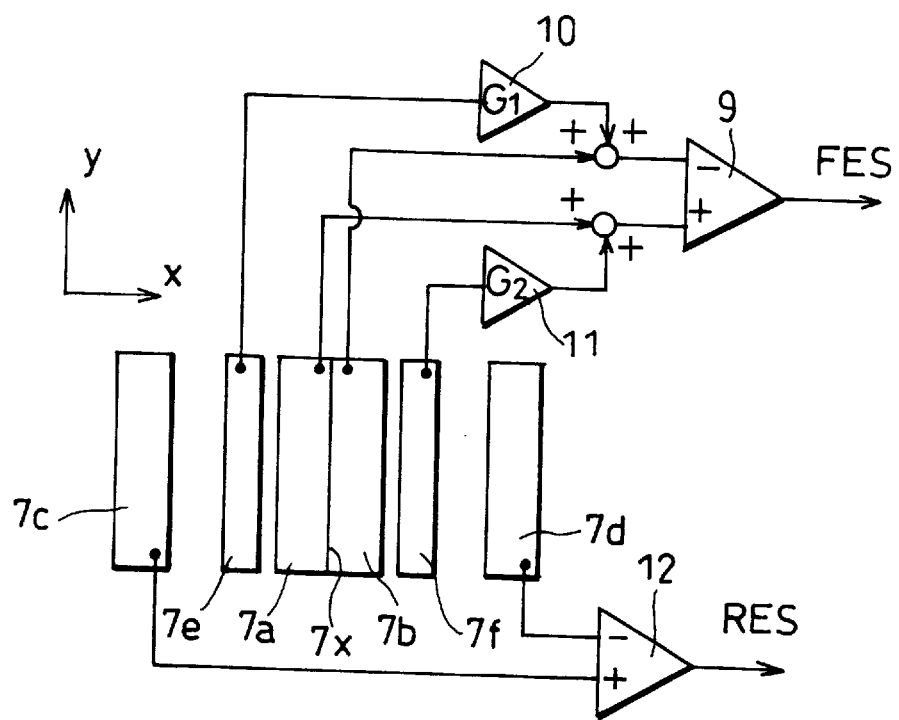
FIG. 11 is a view illustrating still another example of the light receiving element of the optical pickup device.

FIG. 11 illustrates an example arrangement of electric connection. In arrangements such as that illustrated in FIG. 8, the light receiving regions 7a and 7f, 7b and 7e are electrically connected and only the two outputs are supplied to the differential amplifier 9 from the light receiving regions 7a and 7b so as to obtain an FES. On the other hand, in the arrangement shown in FIG. 11, respective outputs Sa, Sb, Se, and Sf of the light receiving regions 7a, 7b, 7e, and 7f are individually detected, and the outputs Se and Sf of the sub light receiving regions 7e and 7f are sent to amplifiers 10 and 11 (amplifying gains: G1, and G2, respectively) so that an FES is found by calculating (Sa+G2×Sf)–(Sb+G1×Se).

With this arrangement, instead of optimizing the shapes and positions of the sub light receiving regions 7e and 7f, or in the case where the quantity of incident light is uneven, adjustment can be achieved by just adjusting the amplifier gains G1 and G2 on the electric circuit. The amplifiers 10 and 11 may be connected to the output terminals of the main light receiving regions 7a and 7b, or may be connected to both of the main and sub light receiving regions.

Note that a differential amplifier 12 shown in FIGS. 8 through 11 serves as a differential amplifier for calculating a difference (Sc–Sd) between the respective outputs Sc and Sd of the light receiving regions 7c and 7d so as to obtain the tracking error signal RES.

The case wherein the push-pull method is used for the tracking servo has been discussed so far in the description of the present invention. However, instead of the push-pull method, the three spots method can be applied for the tracking servo. In the case where the three spots method is applied for the tracking servo, the optical system should have a different structure from that in the present embodiment. Therefore, the case where the three spots method is applied for the tracking servo will be discussed in conjunction with the second embodiment below.

<Second Embodiment>

Figure 12:
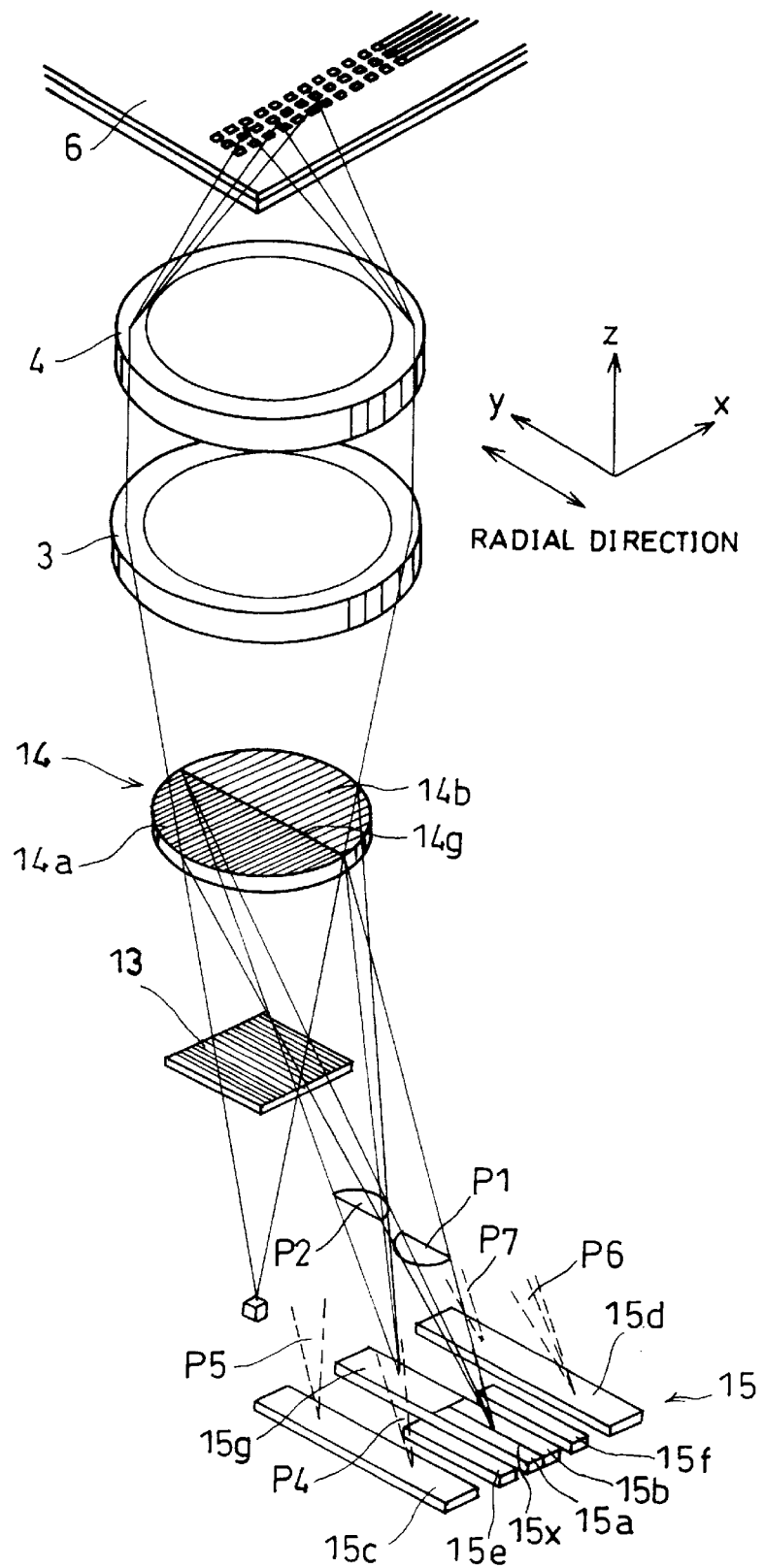
FIG. 12 is a schematic view illustrating an arrangement of an optical system of an optical pickup device in accordance with another embodiment of the present invention.

FIG. 12 illustrates an optical system of an optical pickup in accordance with a second embodiment of the present invention, wherein a three spots method is applied for detecting a tracking error signal.

The composition of the optical parts is substantially the same as that in the first embodiment, except that a diffraction grating 13 is provided between the hologram element 14 and the semiconductor laser 1 and that the hologram element 14 is divided into two. The diffraction grating 13 is provided so that the three spots method is applied for detecting the RES. With the diffraction grating 13, a beam directed to the optical disk 6 is divided into three beams, that is, one main beam (zeroth beam) for recording/reproducing use and two sub beams (±first beams) for tracking use.

The hologram element 14 is, when viewed from the optical disk 6, divided into two division regions 14a and 14b by a division line 14g directed in a y direction which is conformed to a radial direction of the optical disk 6.

On the other hand, the light receiving element 15 has main light receiving regions 15a and 15b for FES detection use, light receiving regions 15c and 15d for RES detection use, a light receiving region 15g for information signal detection use, and sub light receiving regions 15e and 15f for FES compensation use. The main light receiving regions 15a and 15b for the FES detection use and the sub light receiving regions 15e and 15f for the compensation respectively have the same shapes and positions as those of the main and sub light receiving regions described in conjunction with the first embodiment.

In the focalizing state, a light, which has been diffracted at the division region 14a of the hologram element 14 during diffraction of the main beam, forms a beam spot P1 on the division line 15x, while a light which has been diffracted at the division region 14b forms a beam spot P2 in the light receiving region 15g. The two sub beams respectively form beam spots P4 and P5 in the light receiving region 15c, and beam spots P6 and P7 in the light receiving region 15d. As in the first embodiment, output signals from the light receiving regions 15a, 15b, 15c, 15d, 15e, 15f, and 15g are given as Sa, Sb, Sc, Sd, Se, Sf, and Sg, with which a focus error signal FES is generated by calculating (Sa+Sf)−(Sb+Se). The RES is obtained by the three spots method by calculating (Sc−Sd).

Figure 13:
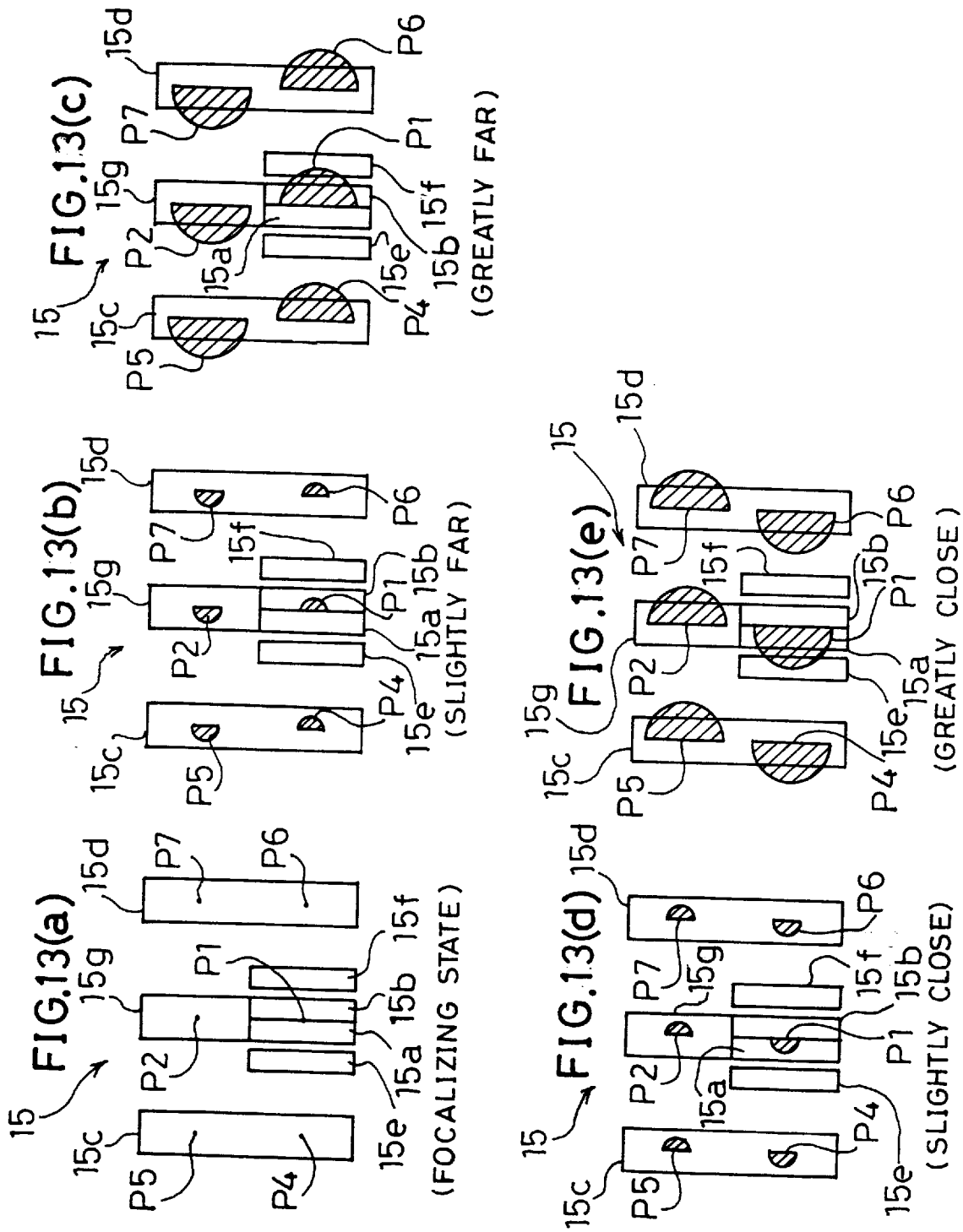
FIG. 13(a) is a view illustrating a light receiving state of the light receiving element of the pickup device in a focalizing state.
FIG. 13(b) is a view illustrating a light receiving state of the light receiving element of the optical pickup device in a slightly defocusing state, wherein an objective lens is positioned farther from the optical disk than in the focalizing state, within the dynamic range.
FIG. 13(c) is a view illustrating a light receiving state of the light receiving element of the optical pickup device in a greatly defocusing state, wherein the objective lens is positioned much farther from the optical disk than in the focalizing state, outside the dynamic range.
FIG. 13(d) is a view illustrating a light receiving state of the light receiving element of the optical pickup device in a slightly defocusing state, wherein the objective lens is positioned closer to the optical disk than in the focalizing state, within the dynamic range.
FIG. 13(e) is a view illustrating a light receiving state of the light receiving element of the optical pickup device in a greatly defocusing state, wherein the objective lens is positioned much closer to the optical disk than in the focalizing state, outside the dynamic range.

FIG. 13(a) illustrates the focalizing state, FIGS. 13(b) and 13(d) illustrate a state of defocusing to some extent, and FIGS. 13(c) and 13(e) illustrate a state of defocusing to a greater extent. In the greatly defocusing state, as illustrated in FIGS. 13(c) and 13(e), the beam spot P1 expands, thereby protruding out of the main light receiving region 15a (first main light receiving region) or the main light receiving region 15b (second main light receiving region) and entering the sub light receiving region 15e (first sub light receiving region) or the sub light receiving region 15f (second sub light receiving region). As a result, the light receiving region 15e or 15f receives light.

By thus arranging the optical pickup device, it is possible to achieve the same effect as that in the first embodiment, with the use of this optical pickup device utilizing the three spots method for detecting the tracking error signal.

As has been so far described, the cases wherein the single knife edge method is utilized for the focus servo have been discussed in the description of the first and second embodiments. In the following description of a third embodiment, a case wherein an astigmatism method is applied for the focus servo. Note that the members having the same structure (function) as those in the first embodiment will be designated by the same reference numerals.

<Third Embodiment>

Figure 14:
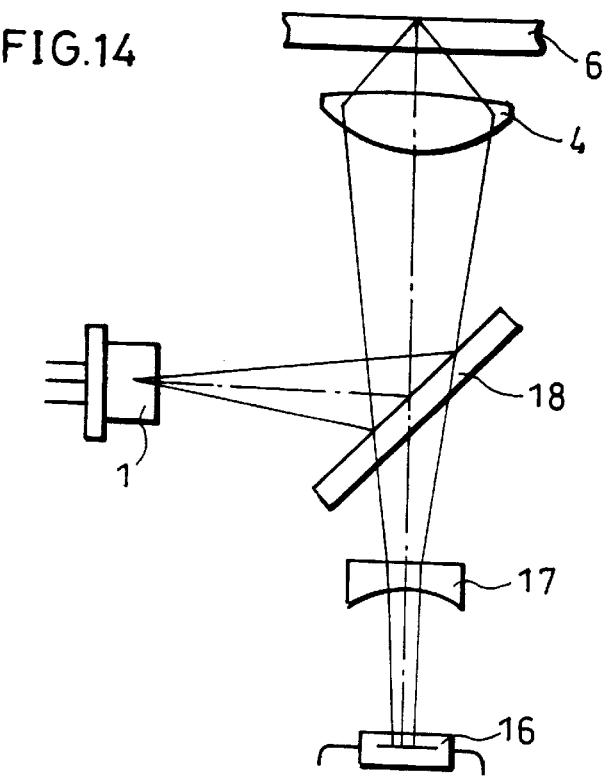
FIG. 14 is a schematic view illustrating an arrangement of an optical system of an optical pickup device in accordance with still another embodiment of the present invention.

An optical system for the use in a pickup device in accordance with the present embodiment includes a semiconductor laser 1, a flat plate beam splitter 18, a detection lens 17, and a light receiving element 16, as illustrated in FIG. 14.

An output light from the semiconductor laser 1 is reflected by the flat plate beam splitter 18, and is converged by the objective lens 4 onto the optical disk 6. A reflected light from the optical disk 6 passes through the objective lens 4, penetrates the flat beam splitter 18, and is converged by the detection lens 17 onto the light receiving element 16. Utilizing an astigmatic phenomenon caused by the penetration of the converged light through the flat plate beam splitter 18, the detection of FES by the astigmatism method is carried out.

The light receiving element 16 includes a quadripartite conventional main light receiving part for focus error detection use, namely, main light receiving regions 16a, 16b, 16c, and 16d. In addition to them, it includes sub light receiving regions 16e, 16f, 16g, and 16h so as to be used for focus error signal compensation which are provided so as to surround the main light receiving regions 16a through 16d. Outputs from the light receiving regions 16a, 16b, 16c, 16d, 16e, 16f, 16g, and 16h are given as Sa', Sb', Sc', Sd', Se', Sg', Sf', and Sh', respectively.

Note that the main light receiving part of the light receiving element 16 has a substantially square shape and is quadrisected by two division lines 16i and 16j constituting diagonals of the square, as illustrated in FIGS. 15(a) through 15(e). Each segment of the quadripartite main light receiving part constitutes each of the main light receiving regions 16a through 16d.

Figures 15A, 15B, 15C, 15D, 15E:
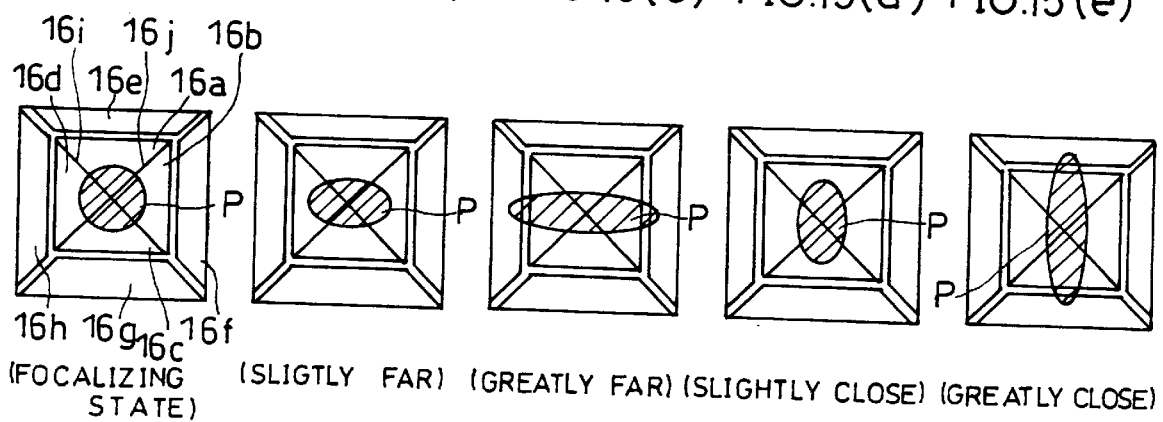
FIG. 15(a) is a view illustrating a light receiving state of the light receiving element of the pickup device in a focalizing state.
FIG. 15(b) is a view illustrating a light receiving state of the light receiving element of the optical pickup device in a slightly defocusing state, wherein an objective lens is positioned farther from the optical disk than in the focalizing state, within the dynamic range.
FIG. 15(c) is a view illustrating a light receiving state of the light receiving element of the optical pickup device in a greatly defocusing state, wherein the objective lens is positioned much farther from the optical disk than in the focalizing state, outside the dynamic range.
FIG. 15(d) is a view illustrating a light receiving state of the light receiving element of the optical pickup device in a slightly defocusing state, wherein the objective lens is positioned closer to the optical disk than in the focalizing state, within the dynamic range.
FIG. 15(e) is a view illustrating a light receiving state of the light receiving element of the optical pickup device in a greatly defocusing state, wherein the objective lens is positioned much closer to the optical disk than in the focalizing state, outside the dynamic range.

In the case of the present embodiment, the position of the light receiving element 16 in an optical axis direction is determined so that the return light forms a beam spot P in a round shape in the focalizing state. As shown in FIG. 15(a), regarding the position of the light receiving element 16 in a direction orthogonal to the optical axis, it is arranged that an intersection point of two division lines 16i and 16j and the center of the beam spot P coincides with each other, so that an output given a s (Sa'+Sc')−(Sb'+Sd') is 0 in the focalizing state.

When the objective lens 4 is positioned farther from the optical disk 6 than in the focalizing state thereby becoming in a defocusing state, the beam spot P has an oval shape stretching from the center toward the main light receiving regions 16b and 16d (second main light receiving regions), as shown in FIGS. 15(b) and 15(c). When the objective lens 4 is positioned closer to the optical disk 6 than in th e focalizing state, the beam spot P has an oval shape stretching from the center toward the main light receiving regions 16a and 16c (first main light receiving regions), as shown in FIGS. 15(d) and 15(e). The focus error signal FES can be obtained by calculating (Sa'+Sc'+Sf'+Sh')−(Sb'+Sd'+Se'+Sg') by the astigmatism method.

Note that when the objective lens 4 slightly defocuses thereby causing the beam spot P to have an oval shape with its major axis either vertically or horizontally directed, the focus error signal FES can be obtained by calculating (Sa'+Sc'+Sf'+Sh')−(Sb'+Sd'+Se'+Sg') by the astigmatism method (note that in the above state, Se'=Sf'=Sg'=Sh'=0).

In this state, in the case where the distance between the objective lens 4 and the optical disk 6 is smaller than that when the objective lens 4 focalizes, the outputs Sa' and Sc' of the main light receiving regions 16a and 16c increase, thereby resulting in that the FES has a positive value. In contrast, in the case where the distance between the objective lens 4 and the optical disk 6 is greater than that when the objective lens 4 focalizes, the outputs Sb' and Sd' of the main light receiving regions 16b and 16d increase, thereby resulting in that the FES has a negative value.

When the objective lens 4 defocuses to a greater extent, the beam spot P protrudes out of the main light receiving regions 16a through 16d, and enters the focus error signal compensation-use sub light receiving regions 16f and 16h (second sub light receiving regions), or 16e and 16g (first sub light receiving regions), which are provided around the main light receiving regions. Therefore, by calculating (Sa'+Sc'+Sf'+Sh')−(Sb'+Sd'+Se'+Sg'), the same effect as that in the first embodiment can be obtained even in the case the astigmatism method is used for detecting a focus error.

In other words, the FES generated using as the main components the outputs Sa' through Sd' of the main light receiving regions 16a through 16d drastically changes in a greatly defocusing state, due to the outputs Se' through Sh' of the sub light receiving regions 16e through 16h, thereby causing the FES curve to quickly converge to 0 outside the dynamic range, as in the first embodiment.

Figure 16:
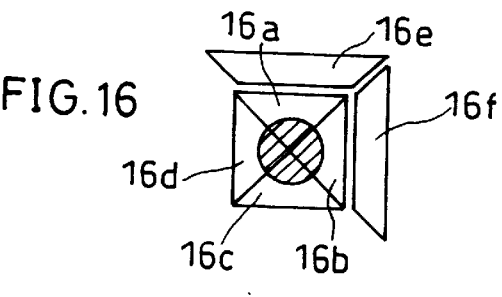
FIG. 16 is a plan view illustrating another arrangement of the light receiving element of the above optical pickup device.

The arrangement wherein the four focus error signal compensation-use sub light receiving regions 16e, 16f, 16g, and 16h are provided around the main light receiving regions is illustrated in FIG. 15, but four of them are not necessarily required. The same effect is obtained with an arrangement having only two light receiving regions provided not oppositely but beside each other among the light receiving regions 16e through 16h as shown in FIG. 16.

Regarding connection between the main receiving regions 16a through 16d and the surrounding sub light receiving regions 16e through 16h, needless to say, metal wires may be used as shown in FIG. 8, or the integrated light receiving patterns having the narrow light receiving portions as shown in FIG. 10, as described in conjunction with the first embodiment. The following arrangement as illustrated in FIG. 11 may be also adaptable: outputs of the FES compensation-use sub light receiving regions 16e through 16h (alternatively, 16e and 16f, or 16g and 16h) may be individually detected, gains of amplification are respectively added to the outputs thus detected, and thereafter a computation is carried out so as to generate the FES.

Figure 17:
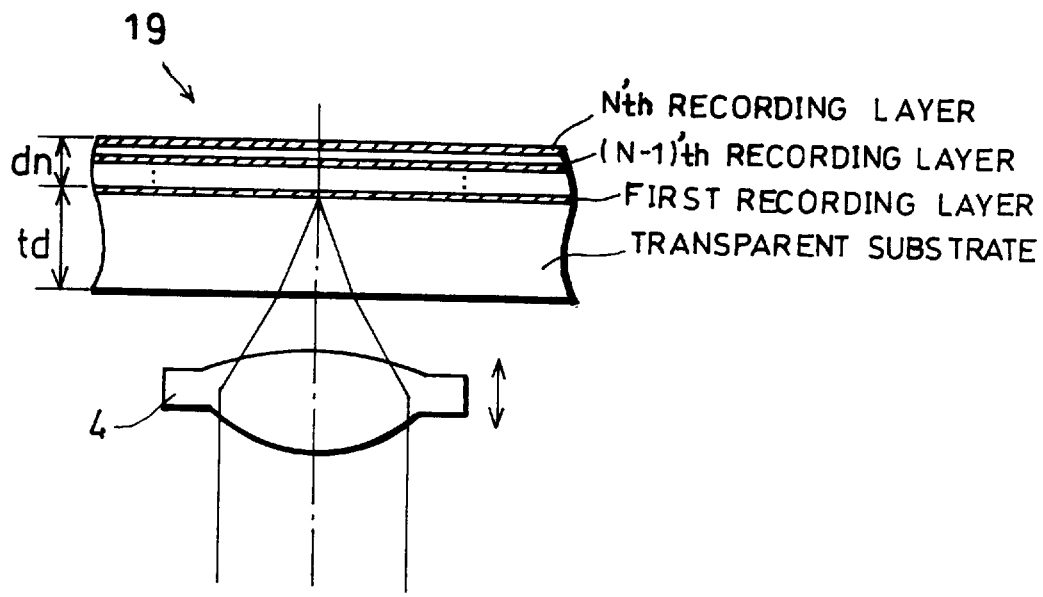
FIG. 17 is a schematic view illustrating a configuration of a multi-recording/reproducing-layer optical disk.

A two-layer disk is used so as to describe the above embodiments, but the same effects are obtained with the use of a multilayer disk 19 having three or more layers, shown in FIG. 17.

As has been described so far, with the use of an optical pickup device in accordance with any one of the above embodiments, it is possible to obtain a normal FES curve even with respect to a multilayer optical disk wherein each interval between layers is sufficiently small. With this arrangement, in the case where a transparent substrate has a thickness td of 1.2 mm, three or more recording layers can be provided thereon, even though a total thickness dn of the laminated recording layers is around 100 μm thereby causing an aberration compensator to be not required.

In other words, with the use of an optical pickup device in accordance with any one of the embodiments, each FES curve obtained with respect to each layer quickly converges to 0 outside the dynamic range. Therefore, even in the case where a plurality of recording layers has a total thickness dn of around 100 μm thereby not requiring an aberration compensator, it is possible to avoid offsets when the objective lens focalizes, thereby enabling information recording/reproducing with respect to a multilayer optical disk.

Figure 18:
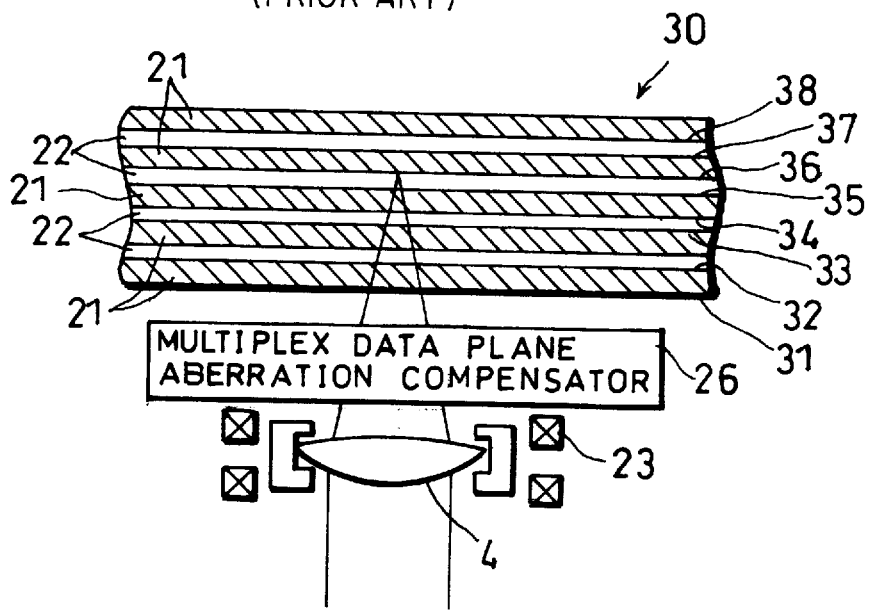
FIG. 18 is a schematic view illustrating an arrangement of an optical system of a conventional optical pickup device.
Figure 19:
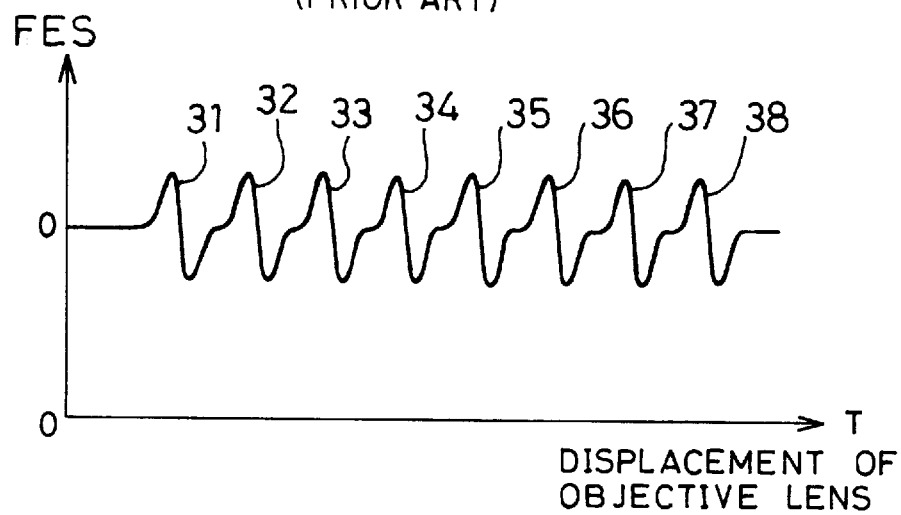
FIG. 19 is a view illustrating an FES curve in the case where the optical pickup device is used.

Furthermore, when the total thickness dn of the plural recording layers is so great in comparison with the substrate thickness that it is not negligible, an aberration compensator is required, but there is no change in the effect that normal FES curves can be obtained from each layer. More specifically, as illustrated in FIG. 18, in the case where, for example, an aberration compensator 26 as aberration correcting means is provided between the optical disk 30 and the objective lens 4, it is possible to conduct information recording/reproducing operations with respect to the optical disk 30 having a plurality of recording layers whose total thickness dn is negligibly great in comparison with the substrate thickness.

Besides, needless to say, in the case of an optical disk having one recording layer as well, it can be expected that by improving FES curves it is possible to obtain more suitable focus servo operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device comprising;

a light receiving element;

separating optical means for converging a laser beam onto one of a plurality of recording/reproducing layers of an optical disk through converging means, while conducting return light of the laser beam projected on the optical disk to said light receiving element; and focus error signal generating means for generating a focus error signal based on an output of said light receiving element which changes in accordance with a change in a relative distance between said converging means and said recording/reproducing layer of the optical disk, wherein:

said light receiving element includes at least two main light receiving regions and at least two sub light receiving regions, said main light receiving regions outputting a main part of the focus error signal, said sub light receiving regions receiving the return light only from a non-recording/reproducing layer to which said converging means is substantially greatly defocused and outputting a compensation part of the focus error signal during a recording/reproducing operation with respect to said recording/reproducing layer; and said focus error signal generating means generates the focus error signal in accordance with the outputs of said main light receiving regions and said sub light receiving regions.

2. The optical pickup device as set forth in claim 1, wherein said main light receiving regions include a first main light receiving region and a second main light receiving region, while said sub light receiving regions include a first sub light receiving region and a second sub light receiving region, in said first main light receiving region and said first sub light receiving region, an area which receives the return light expanding as the relative distance between said converging means and said recording/reproducing layer becomes smaller than that in a focal distance which is obtained when the laser beam is converged on a data plane of the optical disk, in said second main light receiving region and said second sub light receiving region, an area which receives the return light expanding as the relative distance between said converging means and said recording/reproducing layer becomes greater than the focal distance, an output of said first main light receiving region and an output of said second sub receiving region constituting a first combination output, an output of said second main light receiving region and an output of said first sub receiving region constituting a second combination output, wherein said focus error signal generating means generates the focus error signal using a difference between the first combination output and the second combination output.

3. The optical pickup device as set forth in claim 2, wherein said focus error signal generating means generates the focus error signal by the single knife edge method.

4. The optical pickup device as set forth in claim 3, wherein:
said first and second main light receiving regions are formed by dividing a single light receiving region with a division line; and
said first and second sub light receiving regions are provided beside said first and second main light receiving regions, respectively, in symmetrical positions with respect to the division line.

5. The optical pickup device as set forth in claim 4, wherein:
said divided light receiving region has a rectangular shape with its longitudinal direction conformed to a radial direction of the optical disk; and
the division line divides the light receiving region into two in the longitudinal direction.

6. The optical pickup device as set forth in claim 2, wherein said focus error signal generating means generates the focus error signal by the astigmatism method.

7. The optical pickup device as set forth in claim 6, wherein:
said main light receiving region is formed by dividing a substantially square shaped light receiving region by two diagonals into four divisional light receiving regions, one pair of the divisional light receiving regions oppositely provided constituting said first main light receiving regions, the other pair of the divisional light receiving regions oppositely provided constituting said second main light receiving regions; and
said first sub light receiving regions are respectively provided beside the divisional light receiving regions constituting said first main light receiving regions so that the positions of said first sub light receiving regions are symmetrical with respect to an intersection point of the diagonals, whereas said second sub light receiving regions are respectively provided beside the divisional light receiving regions constituting said second main light receiving regions so that the positions of said second sub light receiving regions are symmetrical with respect to the intersection point of the diagonals.

8. The optical pickup device as set forth in claim 6, wherein:
said main light receiving region is formed by dividing a substantially square shaped light receiving region by two diagonals into four divisional light receiving regions, one pair of the divisional light receiving regions oppositely provided constituting said first main light receiving regions, the other pair of the divisional light receiving regions oppositely provided constituting said second main light receiving regions;
said first sub light receiving region is provided beside either of the divisional light receiving regions constituting said first main light receiving regions, whereas said second sub light receiving region is provided beside either of the divisional light receiving regions constituting said second main light receiving regions.

9. The optical pickup device as set forth in claim 1, further comprising an amplifier for adjusting at least either of the signal outputs of the main light receiving regions or those of the sub light receiving regions, wherein said focus error signal generating means generates the focus error signal based on the signal outputs adjusted by said amplifier.

10. The optical pickup device as set forth in claim 1, wherein one of said main light receiving regions and one of said sub light receiving regions are electrically connected in a package, whereas the other main light receiving region and the other sub light receiving region are electrically connected in a package, each combination of the main and sub light receiving regions having one output terminal.

11. The optical pickup device as set forth in claim 10, wherein one of said main light receiving regions and one of said sub light receiving regions are connected with a metal wire, whereas the other main light receiving region and the other sub light receiving region are connected with a metal wire.

12. The optical pickup device as set forth in claim 10, wherein one of said main light receiving regions and one of said sub light receiving regions are integrally provided, whereas the other main light receiving region and the other sub light receiving region are integrally provided.

13. An optical disk recording/reproducing apparatus for recording and reproducing information with respect to an optical disk having a plurality of recording/reproducing layers, said optical disk recording/reproducing apparatus comprising an optical pickup which includes;
a light receiving element;
separating optical means for converging a laser beam onto one of the recording/reproducing layers of the optical disk through converging means, while directing return light of the laser beam projected on the optical disk to said light receiving element; and
focus error signal generating means for generating a focus error signal based on an output of said light receiving element which changes in accordance with a change in a relative distance between the converging means of said separating optical means and a recording/reproducing layer of the optical disk,
wherein:
said light receiving element includes at least two main light receiving regions and at least two sub light receiving regions, said main light receiving regions outputting a major part of the focus error signal, said sub light receiving regions receiving the return light only from a non-recording/reproducing layer to which said converging means is substantially greatly defocused and outputting a compensation part of the focus error signal during a recording/reproducing operation with respect to said recording/reproducing layer; and
said focus error signal generating means generates the focus error signal in accordance with the outputs of said main light receiving regions and said sub light receiving regions.

14. The optical disk recording/reproducing apparatus as set forth in claim 13, wherein said main light receiving regions include a first main light receiving region and a second main light receiving region, while said sub light receiving regions include a first sub light receiving region and a second sub light receiving region,
in said first main light receiving region and said first sub light receiving region, an area which receives the return light expanding as the relative distance between said converging means and said recording/reproducing layer becomes smaller than a focal distance which is obtained when the laser beam is converged on a data plane of the optical disk,
in said second main light receiving region and said second sub light receiving region, an area which receives the return light expanding as the relative distance between said converging means and said recording/reproducing layer becomes greater than the focal distance,
an output of said first main light receiving region and an output of said second sub receiving region constituting a first combination output, an output of said second main light receiving region and an output of said first sub receiving region constituting a second combination output, wherein said focus error signal generating means generates the focus error signal using a difference between the first combination output and the second combination output.

15. The optical disk recording/reproducing apparatus as set forth in claim 14, wherein said focus error signal generating means generates the focus error signal by the single knife edge method.

16. The optical disk recording/reproducing apparatus as set forth in claim 15, wherein:

said first and second main light receiving regions are formed by dividing, with a division line, a single light receiving region which is provided so as to correspond the dynamic range of the focus error signal required for the recording and reproduction with respect to each recording/reproducing layer; and said first and second sub light receiving regions are provided beside said first and second main light receiving regions, respectively, in symmetrical positions with respect to the division line.

17. The optical disk recording/reproducing apparatus as set forth in claim 14, wherein said focus error signal generating means generates the focus error signal by the astigmatism method.

18. The optical disk recording/reproducing apparatus as set forth in claim 17, wherein:

said main light receiving region is formed by dividing a substantially square shaped light receiving region by two diagonals into four divisional light receiving regions, one pair of the divisional light receiving regions oppositely provided constituting said first main light receiving regions, the other pair of the divisional light receiving regions oppositely provided constituting said second main light receiving regions; and said first sub light receiving regions are respectively provided beside the divisional light receiving regions constituting said first main light receiving regions so that the positions of said first sub light receiving regions are symmetrical with respect to an intersection point of the diagonals, whereas said second sub light receiving regions are respectively provided beside the divisional light receiving regions constituting said second main light receiving regions so that the positions of said second sub light receiving regions are symmetrical with respect to the intersection point of the diagonals.

19. The optical disk recording/reproducing apparatus as set forth in claim 13, wherein said optical system further includes aberration correcting means for correcting a spherical aberration with respect to each plane of a plurality of recording/reproducing layers.

20. The optical disk recording/reproducing apparatus as set forth in claim 13, for recording and reproducing information with respect to an optical disk wherein a plurality of recording/reproducing layers are provided at intervals, each interval being one-fold to ten-and-several-fold of the width of the dynamic range.

21. The optical disk recording/reproducing apparatus as set forth in claim 13, for recording and reproducing information with respect to an optical disk having two recording/reproducing layers.

22. A method of generating a focus error signal with the use of a light receiving element divided into a main light receiving region and a sub light receiving region, the main light receiving region receiving a return light of a laser beam projected on one of a plurality of recording/reproducing layers of an optical disk and outputting a main part of a focus error signal, the sub light receiving region receiving the return light only from a non-recording/reproducing layer to which said converging means is substantially greatly defocused and outputting a compensation-use sub part of the focus error signal during a recording/reproducing operation with respect to said recording/reproducing layer, said method comprising the steps of;

(a) outputting the main part of the focus error signal when the main light receiving region receives the return light of the laser beam projected on said recording/reproducing layer, and outputting the compensation-use sub part of the focus error signal when the sub light receiving region receives the return light only from said non-recording/reproducing layer to which said converging means is substantially greatly defocused, during a recording/reproducing operation with respect to said recording/reproducing layer; and b) generating the focus error signal based on the respective outputs of the main and sub light receiving regions.

23. The method as set forth in claim 22, wherein:

in said step (a), only the main light receiving region outputs a signal in the case where the converging means is displaced within the dynamic range, whereas both the main and sub light receiving regions output respective signals in the case where the converging means is displaced to outside the dynamic range; and in said step (b), the focus error signal is generated using a difference between the signal outputted by the main light receiving region and the signal outputted by the sub light receiving region.

24. The method as set forth in claim 23, wherein:

in said step (a), only the main light receiving region outputs a signal in the case where the converging means is displaced within the dynamic range, whereas both the main and sub light receiving regions output respective signals in the case where the converging means is displaced to outside the dynamic range; and in said step (b), so as to correct the focus error signal, an offset caused to the focus error signal by a return light from a recording/reproducing layer adjacent to the recording/reproducing layer on which the laser beam is to be converged is eliminated, by using a difference between the signal outputted by the main light receiving region and the signal outputted by the sub light receiving region when generating the focus error signal.

25. The optical pickup device as set forth in claim 1, wherein:

said separating optical means is a diffraction grating divided into at least two regions with a dividing line substantially orthogonal to a diffractive direction; and the focus error signal is generated by a single knife edge method utilizing diffracted light from at least one of the regions of said diffraction grating.

26. The optical pickup device as set forth in claim 1, wherein said sub light receiving regions are formed to such shapes as to correct an offset of a focus error signal of said recording/reproducing layer which occurs due to entering of the reflected light from the non-recording/reproducing layer to which said converging means is substantially greatly defocused to said main light receiving regions during the recording/reproducing operation with respect to said recording/reproducing layer.

* * * * *